US009693280B2

(12) United States Patent
Ratasuk et al.

(10) Patent No.: US 9,693,280 B2
(45) Date of Patent: Jun. 27, 2017

(54) INTERFERENCE REDUCTION THROUGH CELL ACTIVATION METHODS IN HETEROGENEOUS NETWORKS

(75) Inventors: Rapeepat Ratasuk, Hoffman Estates, IL (US); Michael Bach, Kildeer, IL (US)

(73) Assignee: Nokia Solutions and Networks Oy, Espoo (FI)

( * ) Notice: Subject to any disclaimer, the term of this patent is extended or adjusted under 35 U.S.C. 154(b) by 0 days.

(21) Appl. No.: 14/419,996

(22) PCT Filed: Aug. 8, 2012

(86) PCT No.: PCT/IB2012/054051
§ 371 (c)(1),
(2), (4) Date: Feb. 6, 2015

(87) PCT Pub. No.: WO2014/024001
PCT Pub. Date: Feb. 13, 2014

(65) Prior Publication Data
US 2015/0223135 A1  Aug. 6, 2015

(51) Int. Cl.
*H04W 36/30* (2009.01)
*H04W 16/32* (2009.01)
(Continued)

(52) U.S. Cl.
CPC .......... *H04W 36/30* (2013.01); *H04W 16/32* (2013.01); *H04W 24/10* (2013.01); *H04W 36/20* (2013.01);
(Continued)

(58) Field of Classification Search
CPC ............. H04W 36/30; H04W 72/0413; H04W 52/243; H04W 24/10; H04W 72/1252; H04W 36/20; H04W 16/32; H04W 36/04
See application file for complete search history.

(56) References Cited

U.S. PATENT DOCUMENTS 8,635,335 B2 * 1/2014 Raleigh ............... H04W 36/245
455/456.3
2005/0215265 A1 * 9/2005 Sharma .................. H04L 47/125
455/453
(Continued)

FOREIGN PATENT DOCUMENTS

WO  WO-2011/021975 A1  2/2011
WO  WO-2011/041753 A2  4/2011
(Continued)

OTHER PUBLICATIONS

3rd Generation Partnership Project (3GPP) *Considerations on Macro-Femto eICIC*; 3GPP Draft, Feb. 15, 2011. R1-110946. XP050490673.
(Continued)

*Primary Examiner* — Nathan Mitchell
(74) *Attorney, Agent, or Firm* — Harrington & Smith

(57) ABSTRACT

Apparatus, methods, computer program products, and software are disclosed providing reduction of interference occurring sometime after a capacity booster cell activates, where a coverage area of a capacity booster cell is at least partially within a coverage area of a coverage cell. Techniques include handing off user equipment from the coverage cell to the capacity booster cell, creating by the capacity booster cell scheduling gaps in subframes of radio frames and scheduling user equipment connected to the capacity booster cell in the subframes not in the gaps, scheduling communications for user equipment connected to the coverage cell in the gaps, and performing one or more operations to reduce interference with the capacity booster cell for uplink transmissions from user equipment to the coverage cell.

20 Claims, 13 Drawing Sheets

(51) Int. Cl.
| | |
|---|---|
| *H04W 36/20* | (2009.01) |
| *H04W 72/12* | (2009.01) |
| *H04W 24/10* | (2009.01) |
| *H04W 52/24* | (2009.01) |
| *H04W 72/04* | (2009.01) |
| *H04W 36/04* | (2009.01) |

(52) U.S. Cl.
CPC ..... *H04W 52/243* (2013.01); *H04W 72/0413* (2013.01); *H04W 72/1252* (2013.01); *H04W 36/04* (2013.01)

(56) References Cited

U.S. PATENT DOCUMENTS

| | | | | |
|---|---|---|---|---|
| 2008/0176588 | A1* | 7/2008 | Ashdown | H04W 4/14 455/466 |
| 2009/0264118 | A1* | 10/2009 | Robson | H04W 24/00 455/423 |
| 2009/0280819 | A1 | 11/2009 | Brisebois et al. | 455/446 |
| 2009/0318124 | A1* | 12/2009 | Haughn | G06F 8/65 455/418 |
| 2011/0306347 | A1 | 12/2011 | Choi et al. | 455/438 |
| 2012/0178473 | A1 | 7/2012 | Wiren et al. | 455/456.2 |
| 2012/0184206 | A1 | 7/2012 | Kim et al. | 455/9 |
| 2013/0189971 | A1* | 7/2013 | Callender | H04W 36/0094 455/423 |
| 2014/0031047 | A1* | 1/2014 | Jovanovic | H04W 16/04 455/446 |
| 2014/0242989 | A1* | 8/2014 | Cai | H04W 52/54 455/436 |
| 2014/0287743 | A1* | 9/2014 | Yeh | H04W 28/16 455/426.1 |
| 2015/0011178 | A1* | 1/2015 | Jovanovic | H04W 16/18 455/405 |
| 2015/0249950 | A1* | 9/2015 | Teyeb | H04W 36/0016 455/437 |
| 2015/0351010 | A1* | 12/2015 | Kumar | H04W 48/16 455/434 |
| 2016/0183125 | A1* | 6/2016 | Sun | H04W 28/08 455/453 |

FOREIGN PATENT DOCUMENTS

| | | |
|---|---|---|
| WO | WO 2011048410 A1 | 4/2011 |
| WO | WO-2012/079197 A1 | 6/2012 |

OTHER PUBLICATIONS

3$^{rd}$ Generation Partnership Project (3GPP) "*ABS Signaling Considerations for LTE-A TDD*" 3GPP Draft, Nov. 11, 2010. R1-105940. XP050489846.

CCITT, The International Telegraph and Telephone Consultative Committee; "Data Communication Networks; Information Technology—Open Systems Interconnection—Systems Management: State Management Function"; Recommendation X.731; Jan. 1992; International Telecommunication Union; whole document (29 pages).

3GPP TS 32.762 V11.2.0; "3$^{rd}$ Generation Partnership Project; Technical Specification Group Services and System Aspects; Telecommunication management; Evolved Universal Terrestrial Radio Access Network (E-UTRAN) Network Resource Model (NRM) Integration Reference Point (IRP); Information Service (IS) (Release 11)"; Jun. 2012; whole document (55 pages).

3GPP TS 36.300 V11.2.0; "3$^{rd}$ Generation Partnership Project; Technical Specification Group Radio Access Network; Evolved Universal Terrestrial Radio Access (E-UTRA) and Evolved Universal Terrestrial Radio Access Network (E-UTRAN); Overall description; Stage 2 (Release 11)"; Jun. 2012; whole document (201 pages).

3GPP TS 36.331 V11.0.0; "3$^{rd}$ Generation Partnership Project; Technical Specification Group Radio Access Network; Evolved Universal Terrestrial Radio Access (E-UTRA); Radio Resource Control (RRC); Protocol specification (Release 11)"; Jun. 2012; whole document (302 pages).

3GPP TS 36.423 V11.1.0; "3$^{rd}$ Generation Partnership Project; Technical Specification Group Radio Access Network; Evolved Universal Terrestrial Radio Access Network (E-UTRAN); X2 application protocol (X2AP) (Release 11)"; Jun. 2012; whole document (57 pages).

3GPP TR 36.927 V10.1.0; "3$^{rd}$ Generation Partnership Project; Technical Specification Group Radio Access Network; Evolved Universal Terrestrial Radio Access (E-UTRA); Potential solutions for energy saving for E-UTRAN (Release 10)"; Sep. 2011; whole document (22 pages).

* cited by examiner

| IE/GROUP NAME | PRESENCE | RANGE | IE TYPE AND REFERENCE | SEMANTICS DESCRIPTION | CRITICALITY | ASSIGNED CRITICALITY |
|---|---|---|---|---|---|---|
| MESSAGE TYPE | M | | 9.2.13 | | YES | IGNORE |
| CELL INFORMATION | M | | | | YES | IGNORE |
| >CELL INFORMATION ITEM | | 1..<maxCellineNB> | | | EACH | IGNORE |
| >>CELL ID | M | | ECGI 9.2.14 | ID OF THE SOURCE CELL | – | – |
| >>UL INTERFERENCE OVERLOAD INDICATION | O | | 9.2.17 | | – | – |
| >>UL HIGH INTERFERENCE INFORMATION | | 0..<maxCellineNB> | | | – | – |
| >>>TARGET CELL ID | M | | ECGI 9.2.14 | ID OF THE CELL FOR WHICH THE HII IS MEANT | – | – |
| >>>UL HIGH INTERFERENCE INDICATION | M | | 9.2.18 | | – | – |
| >>RELATIVE NARROWBAND Tx POWER (RNTP) | O | | 9.2.19 | | – | – |
| >>ABS INFORMATION | O | | 9.2.54 | | YES | IGNORE |
| >>INVOKE INDICATION | O | | 9.2.55 | | YES | IGNORE |
| REQUESTED ABS PATTERN INFO | O | | 9.2.5x | | YES | IGNORE |

FIG.7

| IE/GROUP NAME | PRESENCE | RANGE | IE TYPE AND REFERENCE | SEMANTICS DESCRIPTION | CRITICALITY | ASSIGNED CRITICALITY |
|---|---|---|---|---|---|---|
| MESSAGE TYPE | M | | 9.2.13 | | YES | REJECT |
| SERVED CELLS TO ACTIVATE | | 1..<maxCellineNB> | | | GLOBAL | REJECT |
| >ECGI | M | | 9.2.14 | | – | – |
| REQUESTED ABS PATTERN INFO | O | | 9.2.5x | | YES | IGNORE |

FIG.9

| IE/GROUP NAME | PRESENCE | RANGE | IE TYPE AND REFERENCE | SEMANTICS DESCRIPTION |
|---|---|---|---|---|
| CHOICE ABS INFORMATION | M | | – | – |
| >FDD | | | – | – |
| >>SELECT ABS PATTERN FROM | M | | BIT STRING (SIZE(40)) | A BITMAP VALUE OF "1" INDICATES SUBFRAME(S) AS DEFINED IN 9.2.54 FROM WHICH eNB2 IS REQUESTED TO SELECT ITS ABS PATTERN INFO IE VALUE(S) OF "1" |
| >TDD | | | – | – |
| >>SELECT ABS PATTERN FROM | M | | BIT STRING (1..70, ...) | A BITMAP VALUE OF "1" INDICATES SUBFRAME(S) AS DEFINED IN 9.2.54 FROM WHICH eNB2 IS REQUESTED TO SELECT ITS ABS PATTERN INFO IE VALUE(S) OF "1" |

FIG.10

INTERFERENCE REDUCTION THROUGH CELL ACTIVATION METHODS IN HETEROGENEOUS NETWORKS

TECHNICAL FIELD

This invention relates generally to wireless networks and, more specifically, relates to cell activation in heterogeneous wireless networks.

BACKGROUND

This section is intended to provide a background or context to the invention disclosed below. The description herein may include concepts that could be pursued, but are not necessarily ones that have been previously conceived, implemented or described. Therefore, unless otherwise explicitly indicated herein, what is described in this section is not prior art to the description in this application and is not admitted to be prior art by inclusion in this section. Abbreviations that may be found in the specification and/or the drawing figures are defined below at the end of the specification but prior to the claims.

Mobile broadband traffic continues to increase at an astounding rate. Estimates of the increase are as high as a doubling of traffic each year for at least the next five years. Heterogeneous Networks (HetNets) are being utilized more often to increase the traffic capability in congested areas. In these networks, an "overlay" cell (such as a macro cell), with a higher power and a larger coverage area, is complemented with "underlay" cells (such as pico cells) having lower power smaller coverage areas than the macro cell but underlie some portion of the macro cell. The lower power cells reduce demands on the macro cell while at the same time providing additional traffic capacity.

Although the lower power cells are beneficial, during periods of low usage, the lower power cells require additional power usage beyond that required by the macro cell. Therefore, there are currently techniques to allow the lower power cells (or functions thereof) to turn off during periods of low usage. The subsequent turn on of the lower power cells (or the functions thereof) may cause additional problems, which are addressed below.

SUMMARY

This section contains examples of possible implementations and is not meant to be limiting.

In an aspect of the invention, a method includes in response to cell activation of a capacity booster cell, determining users in a coverage area of the capacity booster cell and determining an order of handing off user equipment from a coverage cell to the capacity booster cell based on one or more channel performance metrics. The method also includes handing off at least one user equipment according to the order from the coverage cell to the capacity booster cell.

According to some embodiments, determining an order further comprises sorting user equipment by a channel performance metric of measurements of one or more reference signals for the capacity booster cell as determined by the user equipment and handing off further comprises handing off at least one user equipment with a good connection as determined by the measurements of the one or more reference signals prior to handing off user equipment with not as good a connection as determined by the measurements of the one or more reference signals.

According to some embodiments determining an order further comprises sorting user equipment by a channel performance metric of measurements of the coverage cell as determined by the user equipment and handing off further comprises handing off at least one user equipment having a worse connection as determined by the measurements of the coverage cell prior to handing off user equipment with not as good a connection as determined by the measurements of the coverage cell.

According to some embodiments the channel performance metric comprises one of reference signal received power or reference signal received quality.

According to some embodiments determining an order further comprises sorting user equipment by distances of the user equipment from the capacity booster cell and handing off further comprises handing off at least one user equipment closer to the capacity booster cell prior to handing off user equipment further away from the capacity booster cell.

According to some embodiments determining an order further comprises sorting user equipment by channel quality indication reports of the user equipment for the coverage cell and handing off further comprises handing off at least one user equipment having worse channel quality indication reports prior to handing off user equipment having better channel quality indication reports.

According to some embodiments determining an order further comprises sorting user equipment by maximum data rates configured for user equipment bearers associated with the user equipment for the coverage cell and handing off further comprises handing off at least one user equipment having higher data rates prior to handing off user equipment having lower data rates.

A computer program product includes a computer-readable storage medium bearing computer program code embodied therein for use with an apparatus. The computer program code includes: code for in response to cell activation of a capacity booster cell, determining users in a coverage area of the capacity booster cell; code for determining an order of handing off user equipment from a coverage cell to the capacity booster cell based on one or more channel performance metrics; and code for handing off at least one user equipment according to the order from the coverage cell to the capacity booster cell.

An apparatus is disclosed that includes: means, responsive to cell activation of a capacity booster cell, for determining users in a coverage area of the capacity booster cell; means for determining an order of handing off user equipment from a coverage cell to the capacity booster cell based on one or more channel performance metrics; and means for handing off at least one user equipment according to the order from the coverage cell to the capacity booster cell.

Another exemplary apparatus includes one or more processors and one or more memories including computer program code. The one or more memories and the computer program code are configured, with the one or more processors, to cause the apparatus to perform: in response to cell activation of a capacity booster cell, determining users in a coverage area of the capacity booster cell; determining an order of handing off user equipment from a coverage cell to the capacity booster cell based on one or more channel performance metrics; and handing off at least one user equipment according to the order from the coverage cell to the capacity booster cell.

Another aspect of the invention includes a method including determining, responsive to at least activation of a capacity booster cell, that one or more scheduling gaps should be created using subframes of one or more radio frames in communications by the capacity booster cell. The method includes performing, responsive to the determination and for a time period after the activation of the coverage cell, at least the following: scheduling communications by the capacity booster cell for user equipment connected to the capacity booster cell for subframes in the one or more radio frames that are not the subframes in the scheduling gaps; and performing the scheduled communications for the user equipment connected to the capacity booster cell for subframes in the one or more radio frames that are not the subframes in the scheduling gaps and performing communications in the subframes in the scheduling gaps.

According to some embodiments, the method comprises: the capacity booster cell indicating via one or more messages to a coverage cell the one or more scheduling gaps.

According to some embodiments indicating further comprises the capacity booster cell indicating at least for a selected one of the one or more scheduling gaps when the selected scheduling gap will occur and a length of the selected scheduling gap.

According to some embodiments determining that one or more scheduling gaps should be created further comprises determining that the one or more scheduling gaps should be created responsive to receiving one or more messages, and wherein scheduling further comprises scheduling the one or more scheduling gaps based on one or more indications in the messages from the coverage cell identifying subframes to be used for the scheduling gaps.

According to some embodiments the one or more messages comprise an information element comprising bitmap values identifying the subframes to be used for the scheduling gaps.

According to some embodiments the one or more messages comprise a load information message comprising the information element.

According to some embodiments the one or more messages comprise a cell activation message comprising the information element.

According to some embodiments the one or more messages are received from a coverage cell.

According to some embodiments determining that one or more scheduling gaps should be created further comprises sending a message requesting one or more indications of the scheduling gaps and performing the creating and scheduling responsive to receiving a response having the requested one or more indications of the scheduling gaps.

According to some embodiments the subframes in the one or more scheduling gaps are almost blank subframes.

According to some embodiments the capacity booster cell transmits only one or more of cell-specific reference signals, primary synchronization signals, secondary synchronization signals, or broadcast channel paging during the almost blank subframes.

According to some embodiments the scheduling gaps using subframes of the one or more radio frames and the one or more radio frames are used for downlink from the capacity booster cell to user equipment connected to the capacity booster cell.

According to some embodiments the time period ends at a time when user equipment abnormally within a coverage area of the capacity booster cell while connected to a coverage cell have been handed off such that further user equipment handovers occur based on normal operating handoff trigger values.

According to some embodiments the time is determined in response to one or more of reference signal received power, reference signal received quality, or channel quality indication of user equipment handed over from the coverage cell to the capacity booster cell fall to corresponding certain values.

According to some embodiments the time period ends in response to receiving a load information message that has a pattern of almost blank subframes in the subframe or has a pattern in the message but the pattern does not indicate any almost blank subframes.

According to some embodiments the time period ends in response to radio frequency traffic in the coverage area of the capacity booster cell requiring use of the scheduling gaps.

According to some embodiments performing the scheduled communications further comprises using a reduced power that is less than a normal maximum power during operation which provides a desired coverage area for the capacity booster cell.

According to some embodiments the scheduling gaps using subframes of one or more radio frames and the one or more radio frames are used for uplink from user equipment connected to the capacity booster cell to the capacity booster cell.

An exemplary apparatus includes: means for determining, responsive to at least activation of a capacity booster cell, that one or more scheduling gaps should be created using sub frames of one or more radio frames in communications by the capacity booster cell; means for performing, responsive to the determination and for a time period after the activation of the coverage cell, at least the following: scheduling communications by the capacity booster cell for user equipment connected to the capacity booster cell for subframes in the one or more radio frames that are not the subframes in the scheduling gaps; and performing the scheduled communications for the user equipment connected to the capacity booster cell for subframes in the one or more radio frames that are not the subframes in the scheduling gaps and performing communications in the subframes in the scheduling gaps.

A computer program product includes a computer-readable storage medium bearing computer program code embodied therein for use with an apparatus. The computer program code includes: code for determining, responsive to at least activation of a capacity booster cell, that one or more scheduling gaps should be created using subframes of one or more radio frames in communications by the capacity booster cell; code for performing, responsive to the determination and for a time period after the activation of the coverage cell, at least the following: scheduling communications by the capacity booster cell for user equipment connected to the capacity booster cell for subframes in the one or more radio frames that are not the subframes in the scheduling gaps; and performing the scheduled communications for the user equipment connected to the capacity booster cell for subframes in the one or more radio frames that are not the subframes in the scheduling gaps and performing communications in the subframes in the scheduling gaps. determining, responsive to at least activation of a capacity booster cell, that one or more scheduling gaps should be created using subframes of one or more radio frames in communications by the capacity booster cell;

A further exemplary apparatus includes one or more processors and one or more memories including computer program code. The one or more memories and the computer program code are configured, with the one or more processors, to cause the apparatus to perform: performing, responsive to the determination and for a time period after the activation of the coverage cell, at least the following: scheduling communications by the capacity booster cell for user equipment connected to the capacity booster cell for subframes in the one or more radio frames that are not the subframes in the scheduling gaps; and performing the scheduled communications for the user equipment connected to the capacity booster cell for subframes in the one or more radio frames that are not the subframes in the scheduling gaps and performing communications in the subframes in the scheduling gaps.

In an additional aspect of the invention, a method includes determining one or more scheduling gaps created by a capacity booster cell during a cell activation and user handoff period of the capacity booster cell, wherein the capacity booster cell is to schedule communications for user equipment connected to the capacity booster cell on subframes of one or more radio frames that are not subframes in the one or more scheduling gaps. The method includes scheduling communications to user equipment connected to the coverage cell and to be handed off from the coverage cell to the capacity booster cell on subframes of the one or more radio frames that correspond to the one or more subframes in the one or more scheduling gaps.

According to some embodiments determining further comprises receiving from the capacity booster cell one or more messages indicating the one or more scheduling gaps.

According to some embodiments the one more messages indicate at least for a selected one of the one or more scheduling gaps when the selected scheduling gap will occur and a length of the selected scheduling gap.

According to some embodiments determining further comprises determining the one or more scheduling gaps based on subframes to be used for the scheduling gaps and wherein the method further comprises sending one or more messages from the coverage cell to the capacity booster cell, the one or more messages comprising one or more indications identifying the subframes to be used for the scheduling gaps.

According to some embodiments the one or more messages from the coverage cell comprise an information element comprising bitmap values identifying the subframes to be used for the scheduling gaps.

According to some embodiments wherein the one or more messages comprise a load information message comprising the information element.

According to some embodiments the one or more messages comprise a cell activation message comprising the information element.

According to some embodiments the subframes in the one or more scheduling gaps are almost blank subframes.

According to some embodiments the capacity booster cell transmits only one or more of cell-specific reference signals, primary synchronization signals, secondary synchronization signals, or broadcast channel paging during the almost blank subframes.

According to some embodiments the scheduling gaps using subframes of the one or more radio frames and the one or more radio frames are used for downlink from the capacity booster cell to user equipment connected to the capacity booster cell, and wherein scheduling communications to the user equipment further comprises scheduling downlink communications to user equipment connected to the coverage cell and to be handed off from a coverage cell to the capacity booster cell on downlink subframes of the one or more downlink radio frames that correspond to the one or more downlink subframes in the one or more scheduling gaps.

According to some embodiments the scheduling gaps using subframes of the one or more radio frames and the one or more radio frames are used for uplink from the capacity booster cell to user equipment connected to the capacity booster cell, and wherein scheduling communications to the user equipment further comprises scheduling uplink communications to user equipment connected to the coverage cell and to be handed off from a coverage cell to the capacity booster cell on uplink subframes of the one or more uplink radio frames that correspond to the one or more uplink subframes in the one or more scheduling gaps.

An additional exemplary embodiment includes: means for determining one or more scheduling gaps created by a capacity booster cell during a cell activation and user handoff period of the capacity booster cell, wherein the capacity booster cell is to schedule communications for user equipment connected to the capacity booster cell on subframes of one or more radio frames that are not subframes in the one or more scheduling gaps; and means for scheduling communications to user equipment connected to the coverage cell and to be handed off from the coverage cell to the capacity booster cell on subframes of the one or more radio frames that correspond to the one or more subframes in the one or more scheduling gaps.

In a further exemplary embodiment, a computer program product includes a computer-readable storage medium bearing computer program code embodied therein for use with an apparatus. The computer program code includes: code for determining one or more scheduling gaps created by a capacity booster cell during a cell activation and user handoff period of the capacity booster cell, wherein the capacity booster cell is to schedule communications for user equipment connected to the capacity booster cell on subframes of one or more radio frames that are not subframes in the one or more scheduling gaps; and code for scheduling communications to user equipment connected to the coverage cell and to be handed off from the coverage cell to the capacity booster cell on subframes of the one or more radio frames that correspond to the one or more subframes in the one or more scheduling gaps.

A further exemplary apparatus includes one or more processors and one or more memories including computer program code. The one or more memories and the computer program code are configured, with the one or more processors, to cause the apparatus to perform: determining one or more scheduling gaps created by a capacity booster cell during a cell activation and user handoff period of the capacity booster cell, wherein the capacity booster cell is to schedule communications for user equipment connected to the capacity booster cell on subframes of one or more radio frames that are not subframes in the one or more scheduling gaps; and scheduling communications to user equipment connected to the coverage cell and to be handed off from the coverage cell to the capacity booster cell on subframes of the one or more radio frames that correspond to the one or more subframes in the one or more scheduling gaps.

In another aspect of the invention, another exemplary method includes determining that one or more user equipment are likely to generate interference with a capacity booster cell at some point during a cell activation and user handoff period of the capacity booster cell, where the generated interference occurs on uplink transmissions of the one or more user equipment to the coverage cell. The method also includes performing one or more operations at the coverage cell in order to reduce the interference of the one or more user equipment to the capacity booster cell at least during the cell activation and user handoff period.

According to some embodiments, the method comprises determining that one or more user equipment are likely to generate interference with a capacity booster cell based on measurements taken by the one or more user equipment of one or more cell-specific reference signals of the capacity booster cell.

According to some embodiments performing one or more operations at the coverage cell further comprises reserving certain physical resource blocks for scheduling the one or more user equipment and informing the capacity booster cell of the reserved physical resource blocks through one or more messages.

According to some embodiments the one or more message comprises a high-interference indicator message.

According to some embodiments performing one or more operations at the coverage cell further comprises reducing uplink transmit power of the one or more user equipment from a transmit power calculated from a power control formula for the one or more user equipment for uplink transmissions of the user equipment to the coverage cell.

According to some embodiments the cell activation and user handoff period comprises a time period from activation of the capacity booster cell and ending at a time when user equipment abnormally within coverage area of the capacity booster cell while connected to the coverage cell have been handed off such that further user equipment handovers occur based on normal operating handoff trigger values.

An exemplary apparatus includes means for determining that one or more user equipment are likely to generate interference with a capacity booster cell at some point during a cell activation and user handoff period of the capacity booster cell, where the generated interference occurs on uplink transmissions of the one or more user equipment to the coverage cell; and means for performing one or more operations at the coverage cell in order to reduce the interference of the one or more user equipment to the capacity booster cell at least during the cell activation and user handoff period.

In another exemplary embodiment, a computer program product includes a computer-readable storage medium bearing computer program code embodied therein for use with an apparatus. The computer program code includes: code for determining that one or more user equipment are likely to generate interference with a capacity booster cell at some point during a cell activation and user handoff period of the capacity booster cell, where the generated interference occurs on uplink transmissions of the one or more user equipment to the coverage cell; and code for performing one or more operations at the coverage cell in order to reduce the interference of the one or more user equipment to the capacity booster cell at least during the cell activation and user handoff period.

An additional exemplary apparatus includes one or more processors and one or more memories including computer program code. The one or more memories and the computer program code are configured, with the one or more processors, to cause the apparatus to perform: determining that one or more user equipment are likely to generate interference with a capacity booster cell at some point during a cell activation and user handoff period of the capacity booster cell, where the generated interference occurs on uplink transmissions of the one or more user equipment to the coverage cell; and performing one or more operations at the coverage cell in order to reduce the interference of the one or more user equipment to the capacity booster cell at least during the cell activation and user handoff period.

BRIEF DESCRIPTION OF THE DRAWINGS

In the attached Drawing Figures:

FIG. 7 is an illustration of a table showing possible content of a LOAD INFORMATION message as shown in section 9.1.2.1 of 3GPP TS 36.423 and information for a new exemplary IE in accordance with an exemplary embodiment of the instant invention;

FIG. 9 is an illustration of a table showing possible content of a CELL ACTIVATION REQUEST message as shown in section 9.1.2.20 of 3GPP TS 36.423 and information for a new exemplary IE in accordance with an exemplary embodiment of the instant invention;

FIG. 10 is a table illustrating possible information in the Requested ABS Pattern Info IE, in accordance with an exemplary embodiment of the instant invention.

DETAILED DESCRIPTION OF THE DRAWINGS

Figure 1:
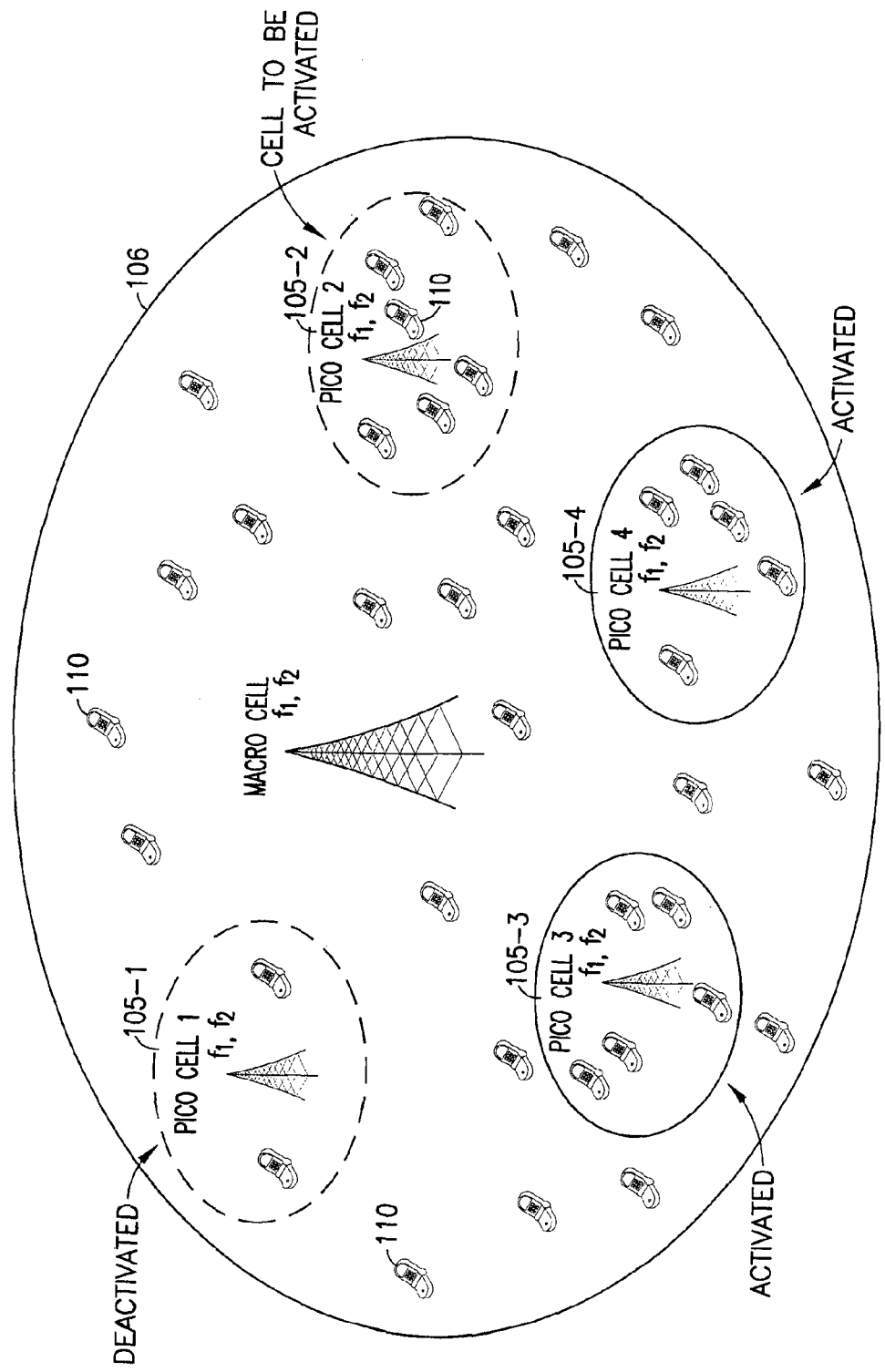
FIG. 1 is an example of pico-cell activation as part of network energy saving.

As part of network energy saving, a wireless network has the ability to turn off cell functions, e.g., radio transmission and reception. This is especially true in a heterogeneous network, e.g., an LTE network with an overlay macro-cell and multiple underlay low-power nodes. This can be performed through a centralized entity (e.g., EMS or SON server) or in a distributed manner through communication between individual eNBs. In the latter case, an eNB has the ability to autonomously turn off functions to save energy if a neighbor cell (e.g., a macro cell) can provide backup coverage for the eNB. In LTE, the eNB object model contains EutranRelation object instances with the identification (ID) of the neighbor cells in the attribute adjacentCell. The ES relation also contains the attribute isESCoveredBy which is defined in 3GPP TS 32.762, section 6.3.9 as: "indicates whether the adjacent Cell according to this planning provides no, partial or full coverage for the cell which name contains the EUtranRelation instance. Adjacent cells with this attribute equal to "yes" are recommended to be considered as candidate cells to take over the coverage when the original cell is about to be transferred to energySaving state." This is illustrated in FIG. 1, for example, where there are four pico-cells 105-1 through 105-4 within a coverage area (shown as a large oval) of a macro-cell 106, and pico cells 1 (105-1) and 2 (105-2) have been deactivated in order to save network energy. The macro eNB (not shown in FIG. 1) can use multiple frequencies and the different frequencies (in this example, $f_1$ or $f_2$) are associated with different macro cells 106 formed by the macro eNB. Similarly, a pico eNB (not shown in FIG. 1) can have multiple frequencies and the different frequencies (in this example, $f_1$ or $f_2$) are associated with different pico cells 105 formed by the macro eNB. Based on certain performance criteria (e.g., traffic utilization or loading, number of users near a pico cell 105, total number of users, user distribution, and the like), the macro cell 106 can decide which pico-cell 105 to activate. Alternately, a pico eNB, where the pico eNB is controlling multiple carriers, may decide the pica eNB requires reactivation of the second cell where a macro cell 106 is currently transmitting. A macro cell 106 may use $f_1$ as its primary carrier and pico cells 105 use $f_2$ as their primary carrier, such that the macro cell is normally deactivated on $f_2$ and pico cells 105 on $f_1$. This means at such times there is no interference between the macro and pica cells. But as the UE load at a pico cell 105 (and possibly macro cell 106) increases, the pico cell 105 associated with $f_1$ may need to be activated to service the increasing load. Either the macro eNB or pico eNB might reactivate the small cell 105 on $f_1$.

As another example, in FIG. 1, the macro cell 106 may determine that a large number of UEs 110 are within the coverage of pica-cell 2 105-2 and may be best served by activating pico-cell 2 105-2. As part of a cell activation and UE handoff process, UEs 110 will be handed off from macro cell 106 to pico cell 2 105-2. However, after pico cell 2 105-2 is activated, UEs 110 within its coverage area (shown as an oval) are still connected to the macro cell 106 and these UEs 110 may experience very high interference from pico cell 2 105-2 if the same carrier frequency (e.g., $f_1$ or $f_2$) is used. This can result in radio link failure (RLFs) for some of the UEs 110. Besides the performance impact of the UE experiences the RLF, these RLFs can negatively impact Mobility Robustness Optimization (MRO) procedures resulting in reduced overall system performance.

Another scenario that results in the reactivation of a dormant cell in the midst of possibly a large number of UEs 110 connected to another cell far away and causing significant interference to the UEs 110 that may result in failures is after a cell goes OOS and later comes back INS. Cell OOS represents that the state management information for the cell indicates either the admininistrativeState attribute value is "locked" or the operationalState attribute value is "disabled". The meanings of these values are defined in: X.731, ITU CCITT, InformationTechnology—Open Systems Interconnection—Systems Management: State Management Function, Jan. 1992. There is currently no indication sent over the X2 interface between nodes indicating a cell OOS to INS state transition. Therefore, reports of RLF/HOF can be more of a problem for this case with respect to the MRO function, given the MRO function is not provided information that a RLF/HOF occurs during the time of a reactivation of a cell from such an OOS condition. The neighbor nodes are informed of a cells being deactivated for energy savings via the Deactivation Indication IE in the X2:eNB Configuration Update message.

Thus, techniques are needed to hand off UEs 110 originally connected to a first cell from the first cell to a reactivated second cell that the UEs 110 are in the midst of, while controlling interference between user equipment and the second cell.

Exemplary embodiments of this invention provide techniques for preventing RLFs/HOFs when underlay (e.g., pico) cells are being activated. The techniques are performed by the network and are completely transparent to the UEs. Certain techniques may reuse existing messaging and interface specification procedures from 3GPP.

Figure 2:
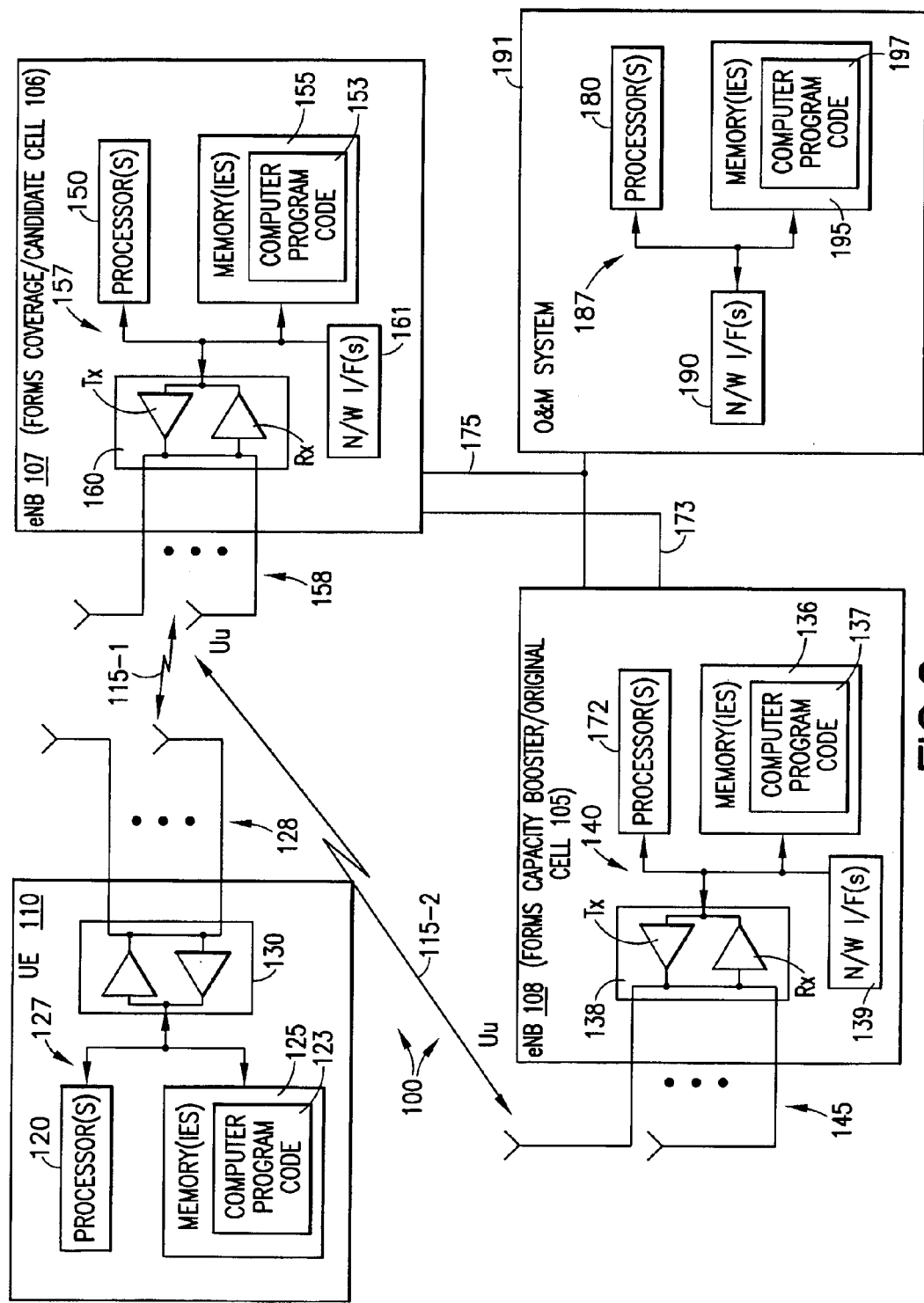
FIG. 2 illustrates an exemplary system in which the exemplary embodiments of the instant invention may be practiced.

Before proceeding with additional description regarding these aspects, reference is made to FIG. 2, which illustrates an exemplary system in which the exemplary embodiments of the instant invention may be practiced. In FIG. 2, a user equipment (UE) 110 is in wireless communication with a wireless network 100 via one (or both) of the wireless links 115-1 (with eNB 107) or the wireless link 115-2 (with pico eNB 108), where the wireless links 115 can implement a Uu interface. The user equipment 110 includes one or more processors 120, one or more memories 125, and one or more transceivers 130 interconnected through one or more buses 127. The one or more transceivers 130 are connected to one or more antennas 128. The one or more memories 125 include computer program code 123. The one or more memories 125 and the computer program code 123 are configured to, with the one or more processors 120, cause the user equipment 110 to perform one or more of the operations as described herein.

The network 100 includes eNB 107, eNB 108, and O&M system 191. In the examples presented herein, the eNB 107 forms the coverage/candidate cell 106 (see FIG. 1) and the eNB 108 forms the capacity booster/original cell 105 (see FIG. 1). It is noted that description herein indicates that "cells" perform functions, but it should be clear that the eNB that forms the cell will perform the functions. The cell makes up part of an eNB. That is, there can be multiple cells per eNB. For instance, there could be three cells for a single eNB carrier frequency and associated bandwidth, each cell covering one-third of a 360 degree area so that the single eNB's coverage area covers an approximate oval or circle. Furthermore, each cell can correspond to a single carrier and an eNB may use multiple carriers. So if there are three 120 degree cells per carrier and two carriers, then the eNB has a total of 6 cells. For simplicity, the coverage areas are referred to as "cells" herein, since the term "cell" is commonly used to refer to a coverage area.

It is further noted that a "capacity booster" cell is a cell having a coverage area that underlies a coverage area of a "coverage" cell. A "coverage" cell has a coverage area that overlays a coverage area of a "capacity booster" cell. As given in 3GPP TS 36.300, an energy savings "function allows, for example in a deployment where capacity boosters can be distinguished from cells providing basic coverage, to optimize energy consumption enabling the possibility for a E-UTRAN cell providing additional capacity, to be switched off when its capacity is no longer needed and to be re-activated on a need basis. The basic coverage may be provided by E-UTRAN, UTRAN or GERAN cells." The term "candidate" cell is also often used e.g. in SA5 for a coverage cell, and the term "original" cell is often used for a capacity booster cell. However, for clarity, the terms "capacity booster" and "coverage" cells as used in TS 36.300 and given above are mainly used herein.

In the examples provided herein, it is assumed the capacity booster cell 105 is a pico cell and the coverage cell 106 is a macro cell. However, this is merely exemplary and the instant invention is applicable to many different types of cells, including micro cells, femto cells, relay cells and cells created by remote radio heads. Such terms as macro, pico, relay, micro, and femto commonly correspond to cell power (and therefore to corresponding coverage area).

The eNodeB 107 includes one or more processors 150, one or more memories 155, one or more network interfaces (N/W I/F(s)) 161, and one or more transceivers 160 (each comprising a transmitter, Tx, and a receiver, Rx) interconnected through one or more buses 157. The one or more transceivers 160 are connected to one or more antennas 158. The one or more memories 155 include computer program code 153. The one or more memories 155 and the computer program code 153 are configured to, with the one or more processors 150, cause the eNodeB 107 to perform one or more of the operations as described herein. The one or more network interfaces 161 communicate over networks such as the networks 173, 175.

The eNB 108 includes one or more processors 172, one or more memories 136, one or more network interfaces (N/W I/F(s)) 139, and one or more transceivers 138 (each comprising a transmitter, Tx, and a receiver, Rx) interconnected through one or more buses 140. The one or more transceivers 160 are connected to one or more antennas 145. The one or more memories 136 include computer program code 137. The one or more memories 136 and the computer program code 137 are configured to, with the one or more processors 172, cause the eNB 108 to perform one or more of the operations as described herein. The one or more network interfaces 139 communicate over networks such as the networks 173, 175.

The O&M system 191 includes one or more processors 180, one or more memories 195, and one or more network interfaces (N/W I/F(s)) 190 interconnected through one or more buses 187. The one or more memories 195 include computer program code 197. The one or more memories 195 and the computer program code 197 are configured to, with the one or more processors 180, cause the O&M system 191 to perform one or more of the operations as described herein. The one or more network interfaces 190 communicate over networks such as the networks 173, 175. Certain description herein refers to a C-SON server. Such a server normally connects to O&M system 191 and for purposes here can be considered part of O&M system 191.

The eNodeB 107 and the eNB 108 communicate using, e.g., network 173. The network 173 may be wired or wireless or both and may implement, e.g., an X2 interface as specified in TS 36.423. The O&M system uses the network 175 to communicate with the eNodeB 107 and eNB 108. The network 175 may be wired or wireless or both and may implement, e.g., an Itf-S. The computer readable memories 136, 155, and 195 may be of any type suitable to the local technical environment and may be implemented using any suitable data storage technology, such as semiconductor based memory devices, flash memory, magnetic memory devices and systems, optical memory devices and systems, fixed memory and removable memory. The processors 150, 172, and 180 may be of any type suitable to the local technical environment, and may include one or more of general purpose computers, special purpose computers, microprocessors, digital signal processors (DSPs) and processors based on a multi-core processor architecture, as non-limiting examples.

Figure 3:
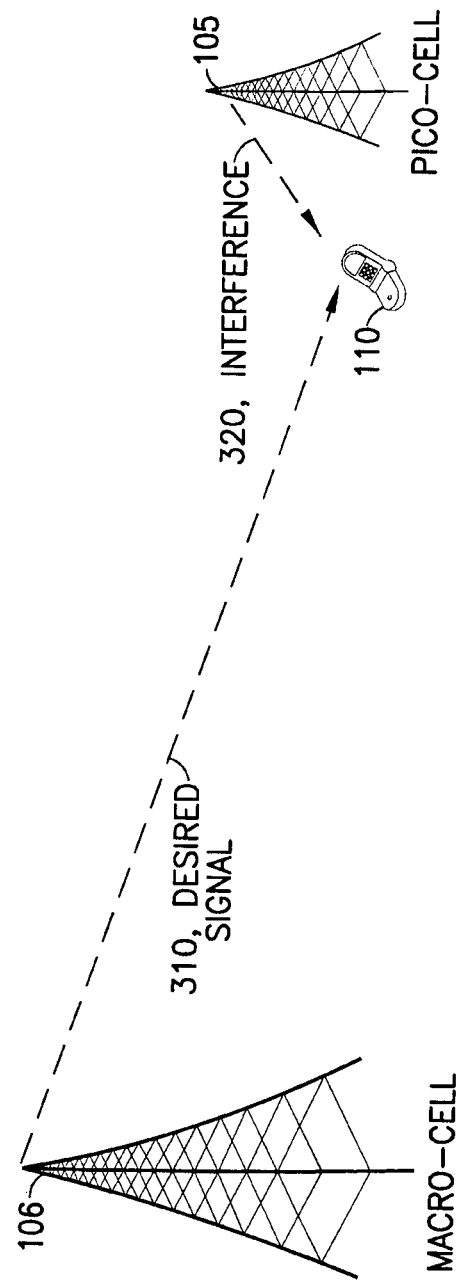
FIG. 3 illustrates an example of RLF when a pico cell is activated.

In accordance with certain exemplary embodiments herein, when a cell is first activated, only common signals and common channels are transmitted (e.g. PSS/SSS, CRS, PBCH, and PDCCH/PDSCH related to SIBs) so the subframes from/to the cell are mostly empty. UEs 110 nearby the activated cell will start reporting measurements e.g. of the common reference signal (CRS) related to the newly activated pico cell 105 and the macro cell 106 can prepare those UEs for handover by sending X2:HANDOVER REQUEST messages to the pico cell. As UEs 110 are handed over to the pico cell 105, the DL subframes will start to fill up with traffic and the pico cell 105 will start to generate significant interference to the UEs 110. This may result in radio link or handover failures. This is illustrated in FIG. 3. For example, the UE 110 is connected to the macro cell 106 with SINR of 3 dB. The farther away the macro cell 106 is from the UE 110, the lower the SINR is expected to be. After the pico cell 105 is activated and users are connected to the pico cell 105, the pica cell 105 generates significant amounts of interference 320 due to its close proximity to the UE 110 and the SINR of the UE drops to −10 dB. At this point, the UE 110 cannot receive control information and data (e.g., from desired signal 310) from the macro cell 106 anymore and therefore cannot communicate with the macro cell 106. As a result, the macro cell 106 or UE 110 may declare an RLF. Also, UEs 110 in the process of being handed over via Uu RRC message exchange with the macro cell 106 may be unable to do so, resulting in HOF. If the UE 110 has been prepared at the pico cell 105 by receiving necessary parameters from another node in a X2: HANDOVER REQUEST message (3GPP TS 36.423), the UE 110 will then use procedures described in 3GPP TS 36.331 to re-establish a connection to the pico cell 105. Otherwise, the re-establishment procedure will fail and the UE 110 will then need to send messages to setup a connection again with the EPC and the eNB 107. Either way, this may trigger pico reports to the macro cell 106 about the RLF/HOF failure, resulting in pegging an associated accumulation of such events as part of the SON MRO function. There is a difference between HOFs due to the interference caused by reactivation of cells as described herein compared with HOFs associated with a typical HO occurring at the coverage boundaries of two activated cells. A SON MRO function designed to optimize the handover triggers at the coverage boundaries of two activated cells based on reported RLFs/HOFs that occur during such procedures could be corrupted by RLFs/HOFs due to reactivation of dormant cells as described herein. The SON MRO function may be able to differentiate the scenarios by reception of an X2:eNB CONFIGURATION UPDATE message indicating that a cell has recently reactivated and correlating the events, but it is preferable to avoid such failures from occurring. If the reason for the reactivation is due to the node-cell being unlocked or recovery from a failure, the eNB CONFIGURATION UPDATE message is not currently sent via X2-AP and thereby does not provide a signal for the SON MRO function to recognize the event and possible associated HOFs/RLFs.

As stated above, exemplary embodiments of this invention provide techniques for preventing RLFs/HOFs and high numbers of block errors when underlay (e.g., pico) cells are being activated. Exemplary details of the instant invention are presented as a number of "concepts" below. The concepts are not meant to be limiting and are not meant to imply that embodiments in one concept cannot be used with embodiments in another concept.

Figure 4:
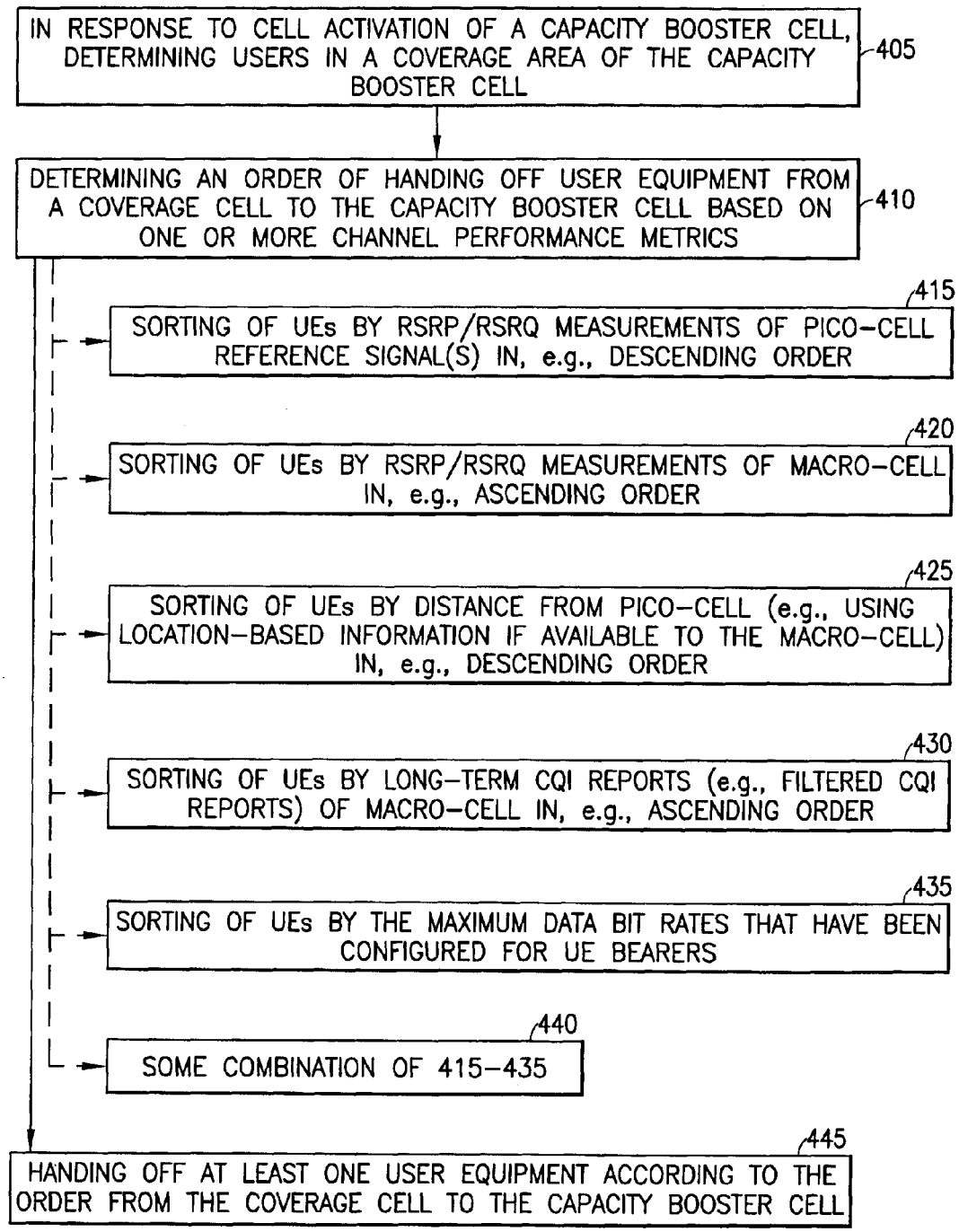
FIG. 4 is a flowchart depicting one example of a method for performing an exemplary embodiment of the instant invention.

In a first concept, the macro cell 106 will determine an order of UEs for handover based on expected interference from the pico cell 105. FIG. 4 is a flowchart of a method for performing this concept. The blocks of the method are performed, e.g., by eNB 107, which forms the coverage cell 106. FIG. 4 is a logic flow diagram that illustrates the operation of a method, and a result of execution of computer program instructions embodied on a computer readable medium. The method begins in block 405, where the eNB 107, in response to cell activation of a capacity booster cell 105, performs the operation of determining users in a coverage area of the capacity booster cell 105. In block 410, the eNB 107 performs the operation of determining an order of handing off user equipment from a coverage cell to the capacity booster cell based on one or more channel performance metrics. Block 410 may be performed by any one of blocks 415-440. Users that are likely to experience high interference are handed over first (block 445). This can be performed using either explicit or implicit measurements via the following:

- Sorting (block 415) of UEs 110 by RSRP/RSRQ measurements of pico-cell reference signal in, e.g., descending order and handing off (block 445) users in that order from the coverage cell 106 to capacity booster cell 105. Users with expected good connections to the pico cell 105, based on RSRP/RSRQ measurements, are handed off first.
- Sorting (block 420) of UEs 110 by RSRP/RSRQ measurements of the macro cell 106 in, e.g., ascending order and handing off (block 445) users in that order (i.e., from the worst RSRP/RSRQ to the best RSRP/RSRQ). Users with the worst connections to the macro cell 106 are handed off first. That is, users with worse connections are handed off prior to users with better connections.
- Sorting (block 425), of UEs 110 by distance from the pico cell 105 (e.g., using location-based information if available to the macro cell 106) in, e.g., ascending order and handing off (block 445) users in that order. Users closer to the pico cell 105 are handed over first.
- Sorting (block 430) of UEs 110 by long-term CQI reports (e.g., filtered CQI reports) of the macro cell 106 in ascending order and handing off (block 445) users in that order (i.e.; from the users with the worst CQI to the users with the best CQI). The worst users are handed off first. Long-term can mean over multiple CQI reports (e.g., average value or filtered value using some decaying constant).
- Sorting (block 435) of UEs 110 by the maximum data bit rates that have been configured for UE bearers and handing off (block 445) users in that order (i.e., from highest data rate to lowest data rate). High data rate users, in particular for the uplink from UE to eNB are handed over first.
- Some combination of the above (block 440).

The order (i.e., ascending or descending) described above is merely exemplary and an opposite order may used. Also, note that explicit measurements are those that directly convey interference information like CQI and RSRQ, whereas implicit measurements require additional processing to obtain interference information (e.g., distance from cell or maximum data rate).

Note that it is assumed that the macro cell 106 already has candidate UEs 110 for handing off to the pico cell 105 based on handover measurements from the UEs after the pico cell 105 is activated. Deactivated capacity booster cells may also be requested to first transmit the minimum information necessary during a preliminary phase. This is part of one solution discussed in 3GPP TR 36.927 regarding how capacity booster cells exit dormant mode efficiently. When some capacity booster cells 105 are in dormant mode and the load increases on the coverage cell 106, the coverage cell may not know the most appropriate dormant/deactivated E-UTRAN cells to wake-up. The capacity booster cells may be requested to first transmit the minimum information necessary such that the capacity booster cells only enable UEs to make measurements of capacity booster cells. This then allows determination of which capacity cells will provide the highest offload capability of UEs from the coverage cell. These capacity booster cells are then fully activated such that the capacity booster cells can accept UE connections (other pico cells go back dormant). At this point UEs within the coverage area of the pico cell being activated are known.

Figure 5:
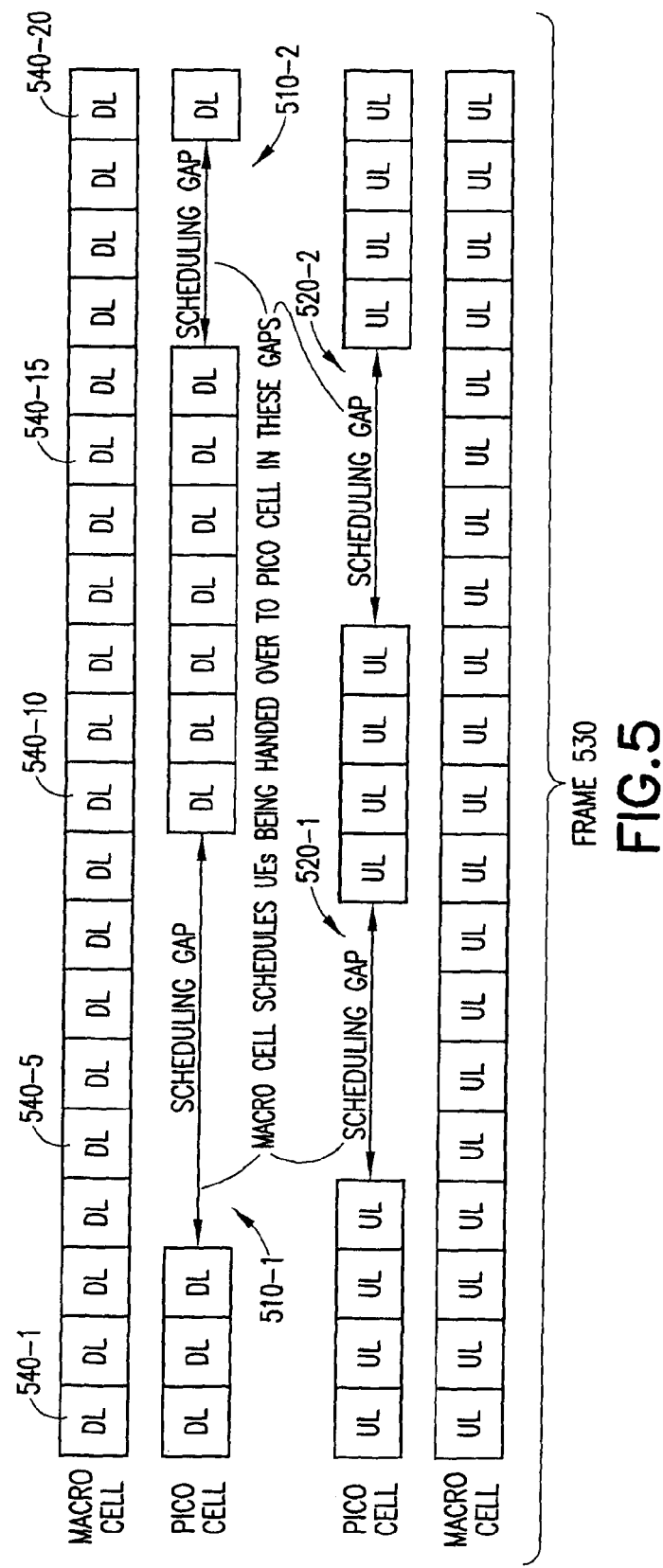
FIG. 5 illustrates examples of pico-cell scheduling gaps to prevent RLF/HOF.
Figure 6:
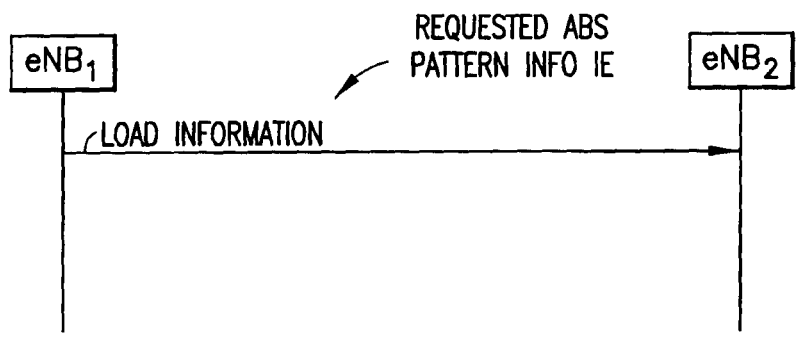
FIG. 6 illustrates Figure 8.3.1.2-1, "Load Indication, successful operation" of 3GPP TS 36.423 V11.1.0 (June 2012) and also an exemplary IE for an exemplary embodiment of the instant invention.

Regarding a second concept, the capacity booster eNB 108 will create DL scheduling gaps to allow macro-cell UEs 110 within its coverage area an opportunity to decode transmissions from the macro cell 106. Strictly speaking, the capacity booster cell 105 is activated when its radio is turned on. The use of the scheduling gaps concern the period after the radio is turned on, when UEs within the capacity booster cell's coverage area are being transitioned from the macro cell 106 to the capacity booster cell 105. FIG. 5 illustrates examples of pico-cell scheduling gaps to prevent RLF/HOF and reduce block errors. A radio frame 530 is shown with 20 subframes 540-1 through 540-20. Typically, up to 40 subframes are allowed. The capacity booster eNB 108 will create scheduling gaps 510-1 (subframes 540-4 through 540-9) and 510-2 (subframes 540-17 through 540-19) in the pico cell's transmissions on the DL. Usage of ABS typically requires time synchronization of the involved nodes such that their Uu subframes are aligned in time. From the figure, it can be seen that there is no capacity loss in the macro cell 106 since all subframes are being utilized. Based on the handover prioritization and message exchanges as described below, the macro cell 106 will restrict scheduling the PDCCH/PDSCH of users that are in the process of switching to the pico cell 105 within the gaps 510 (and 520, described below) created by the pico cell and communicated to the macro cell 106. Exemplary details of these techniques include the following.

1) Information exchange may occur between the capacity booster cell 105 and coverage cell 106 with relevant information, e.g., number of pending and current handovers to pico-cell, RSRP measurements from those UEs, and the like. The LTE eICIC capability introduced in R10 (Release 10) allows an eNB to send a known Almost Blank Subframe (ABS) pattern in the X2: Load Info message based on EMS configuration and pico cells CRE UE's loads received via the X2:Resource Status Update message. As described in TS 36.300: "For the time domain ICIC, subframe utilization across different cells are coordinated in time through backhaul signalling or OAM configuration of so called Almost Blank Subframe patterns. The Almost Blank Subframes (ABSs) in an aggressor cell are used to protect resources in subframes in the victim cell receiving strong inter-cell interference. Almost blank subframes are subframes with reduced transmit power (including no transmission) on some physical channels and/or reduced activity. The eNB ensures backwards compatibility towards UEs by transmitting necessary control channels and physical signals as well as System Information." During an ABS subframe, the pico cell 1-5 may only transmit CRS, PSS, SSS, and BCH paging. Section 9.2.54 of 3GPP TS 36.423 V11.1.0 (June 2012) states the following about ABSs: "Almost blank subframes are subframes with reduced power on some physical channels and/or reduced activity." This allows an eNB (e.g., macro) causing interference (e.g., to CRE PUEs) to reduce interference to the PUEs. In a HetNet environment as discussed herein, eICIC may be in use per the current art for to protect UEs at an extended range at activated pico cells. This is indicated in 36.300 section 20.2.2.6: "When the time-domain inter-cell interference coordination is used to mitigate interference, the eNB signals its almost blank subframe (ABS) patterns to its neighbor eNBs, so that the receiving eNB can utilize the ABS of the sending eNB with less interference. NOTE: A typical use case of the time-domain solution of inter-cell interference coordination is the one where an eNB providing broader coverage and therefore being more capacity constrained determines its ABS patterns and indicates them to eNBs, providing smaller coverage residing in its area." Via use of a different ABS pattern in the X2: Load Information message but in the opposite direction (pico to macro), a pico cell 105 can also inform the macro cell (e.g., coverage cell 106) of when a scheduling gap will occur for the pico cell so that the macro cell can schedule control and data to affected UEs in those subframes. Such a pico ABS pattern can be sent upon a cell reactivation (e.g., or activation) by a pico. See section 9.2.54 for the current specification for the ABS Information from 3GPP TS 36.423.

2) The capacity booster cell 105 (e.g., a pico cell) creates periodic DL scheduling gaps, e.g., via ABS patterns. An example of a DL scheduling gap is no PDSCH and also maybe no PDSCH/PDCCH. That is, ABS generally means no transmission on some physical channels, such as PDSCH and/or PDCCH. In LTE, there is also another term—LPS (low-power subframe) where all the channels are transmitted but at reduced power. LPS is also a possibility for the scheduling gaps. It should be noted, however, in LTE, LPS is not the same as ABS (i.e., UEs treat ABS and LPS subframes differently). ABS subframes can also have CSI-RS and may also contain PDCCH. For LPS, all channels are transmitted. Within the reported almost blank subframes, the pico-cell does not schedule any DL users (i.e., creating almost blank subframes as a macro does). The pico cell can decide how many blank frames to indicate based on how many subframes the pico cell actually needs for message communication as UEs connect to the pico cell. So the pico may start with many subframes indicated as ABS in its ABS pattern, reserving some subframes for communicating with the UEs connected to the pico cell and others for use by additional UEs to be handed in. The pico cell chooses different subframes to almost blank than those used by the covering macro cell and can use any ABS pattern received from the macro to schedule its messages with PUEs. If neighbor pico cells (e.g., neighbor capacity booster cells 105) are sending an ABS pattern also, then different ABS can be used from those as well to minimize interference between them. As the number of connected UEs 110 increases at the pico cell, the number of ABS the pico cells reports may be decreased. Meanwhile the macro cell 106 can use this information from the pico cell 105 regarding the ABS pattern the pico cell 105 will use so that in those ABS subframes the macro cell 106 can schedule transmission blocks of data for UEs, including the HO data the macro cell 106 wishes to send to the UE, thereby reducing the interference to those UEs from the pica cell 105. The pica cell 105 may discontinue its ABS pattern reporting after a suitable amount of time for allowing all UEs experiencing high interference to be handed over to the pico cell. This should be not needed beyond a few minutes, although such time period is not a limit to this embodiment. A pico cell 105 may autonomously begin reporting its ABS pattern on cell reactivation or upon receiving an Invoke Indication IE in the X2: LOAD INFORMATION message from the macro cell 106 or upon receiving a Requested ABS Pattern Info IE as described later. More precision is possible via usage of the ABS status IE by a macro cell 106 to indicate how much information (e.g., messages) the macro cell 106 expects to need that need protection from the pico cell 105. Such a procedure could be initiated by the pico cell 105 requesting such status information via the X2:RESOURCE STATUS REQUEST message. The macro cell 106 would then indicate a successful or unsuccessful outcome of the procedure based on whether the macro cell 106 supports such capability or not. If supported, the macro cell 106 uses the ABS status to indicate the frequency and length of the silence period the macro cell 106 needs depending on the number of pending and current handovers as well as particular subframes it would prefer the pico to use for its ABS.

3) Alternately or in addition to the scheduling gaps, the pico cell 105 can transmit but at reduced power (i.e., power less than the normal maximum power during pico operation which provides the desired entire pico coverage area) at initial activation and ramp power up in time to the maximum in order to reduce the amount of interference generated to UEs. The PDSCH transmit power can be ramped up during activation while the CRS power is kept fixed to avoid having to update this information to the UEs. For CRS-based Transmission Modes, this means restricting the data transmission to QPSK (quadrature phase shift keying) modulation only since pilot-to-power data ratio is not needed by the UEs in this case. For DMRS-based TMs, there is no issue with dynamic power reduction. The amount of pico-cell power reduction can be based on expected interference to the affected UEs. The macro cell 106 can also adjust the MCS of the UEs that are in the coverage area of the pico cell 105.

Turning to a third concept, in the UL, the opposite problem occurs where macro-cell UEs within and nearby the pico cell coverage area are generating a significant interference to the pico-cell. That is, macro-cell UEs will transmit at high power since the macro-cells UEs are far away from the macro cell 106 (see FIG. 3). The UEs could be UEs inside or outside the pico cell's coverage area, but (if outside) nearby the coverage area. In an exemplary embodiment, the macro cell 106 can determine the pico cell 105 has reactivated because the macro cell 106 activated the pico cell 105. This will introduce significant interference to the UL of the pico cell 105. The macro cell 106 can recognize these UEs 110 by their measurement reports of the pico cell's CRS. Several techniques can be used to manage this interference, as follows.

Fractional frequency reuse may be used. The macro-cell eNB 107 can reserve certain PRBs for scheduling high-interference UEs and inform the pica cell 105 of these PRBs with high power through the use of HII (UL High-Interference Indication) IE in the LOAD INFORMATION message available in LTE.

Power control may be used. The macro-cell eNB 017 can reduce the uplink transmit power of the high-interference UEs from a maximum power normally used by the UEs. It should be noted that both fractional frequency reuse and power control may be used. In LTE, a UE 110 follows a power control formula. This formula has two parts—one part determined solely by the UE, one part is provided by the eNB. For instance, Power=A (UE part)+B (eNB part) If the eNB determines that this is a high-interference UE, it can then lower the transmit power by sending a power down command on the part B that is provided by the eNB. This will reduce the power as determined by the UE on part A.

Scheduling gaps may be used. The pico-cell eNB 108 can create scheduling gaps where the eNB 108 will not schedule any users in the uplink and inform the macro cell 106 of the gaps. See the gaps 520-1 and 520-2 in FIG. 5. This is similar to the DL gaps in the second concept, e.g., the macro cell 106 can use ABS pattern reports from the pica cell 108 to schedule MUEs generating high interference in those subframes. The reason for the requiring the pico cell 105 to create the gaps (rather than the other way around) is that it is expected that traffic will be lighter on the pico cell 105 during this period, so this is less likely to affect system performance.

Regarding a fourth concept, it was previously detailed in, e.g., the second concept that a capacity booster cell 105 (e.g., a pico cell) creates periodic DL scheduling gaps 510, e.g., via ABS patterns. In the third concept, the capacity booster cell 105 had the ability to create UL scheduling gaps 520. In the second and third concepts, the capacity booster cell 105 was primarily responsible for determining the DL scheduling gaps 510 and uplink scheduling gaps 520. In the fourth concept, the coverage cell 106 (i.e., eNB 107) controls at least in part the determination by a small cell, e.g. a capacity booster cell 105 of the DL scheduling gaps 510 and uplink scheduling gaps 520 the small cell will advertise via X2. The reason for the coverage cell to do so is if multiple small cells (e.g., pico, HeNB, micro, relay) were to autonomously select the same or similar ABS patterns, then the macro/coverage cell may not have enough flexibility to send all the information the coverage cell needs to send to UEs within small-cells needing protection from strong interferers if it has to use the same or similar indicated protected subframes. Since the coverage cell initiates the Cell Activation Request message to the small cells the coverage cell wants activated, the coverage cell can also choose the subframes the coverage cell requests the small cell to choose their ABS patterns from such that conflicts among the different small cells is avoided. Note the small cells may be widely distributed within the macro-cell coverage area and thus the small cells are likely not neighbors of each other nor share an X2 interface. Thus the small cells do not know what ABS patterns other small cells within the macro-cell coverage area are selecting.

It is worth noting that not only cells dormant for ES that are reactivated can cause high interference to nearby MUEs that are in fact within the coverage area of the small cell. Other cases where a small cell may need to indicate transmission of ABSs are CSG and Hybrid HeNBs. Because such HeNBs may be closed for use to UEs except those subscribed with the associated subscriber group (e.g., the people living at the home), an MUE that comes close to the HeNB may not be able to connect to the HeNB while still suffering high interference from the HeNB. Thus such an HeNB may generate an ABS type pattern of its own to provide a nearby MUE an opportunity to communicate without excessive interference from the HeNB. Per 16.1.5.2.1 of TS 36.300 version V11.2.0: "When the time-domain inter-cell interference coordination is used for non-members UE in close proximity of a CSG cell, OAM configures a CSG cell not to use a time domain resource set (i.e. a set of subframes), so that a non-member UE in close proximity of the CSG cell can be still served by another cell. OAM also configures a cell neighbour to a CSG cell with the protected time domain resource set not used by the CSG cell, so that the neighbour cell knows which time domain resource can be used for a non-member UE in close proximity of the CSG cell." While the current version of TS 36.300 does not currently support the X2 interface between HeNBs and a macro eNB, let alone a HeNB sending a ABS pattern via X2, the need for small cells to do so is foreseen, e.g. to relieve the Operator of the burden to configure and dynamically adjust for an appropriate ABS pattern that each small cell node should use to avoid conflicts. As there may be many HeNBs and pico cells within the coverage area of a macro, the central MeNB has the overall view of all the ABS patterns in use and therefore can better chose the ABS pattern a small cell should use at a given point of time to avoid too much overlap of the ABS patterns among all of them. Another use case where MUEs may benefit from ABS protection by a small cell (such as a pico cell) interference is if the UE is travelling at high speed such that it is not worth trying to quickly hand into and out of the pico cell as the UE traverses quickly across the pico cell's coverage area at a high rate of speed. Rather the UE is kept connected to the macro while within the pico coverage area and the macro uses a pico ABS pattern to decide when to best communicate with the UE, i.e. during periods of reduced interference. Again, the macro cell is best equipped to decide the ABS pattern a pico cell should use for this case and the network can benefit from macro's dynamically informing the small cells in the hetnet the ABS patterns they should use via this fourth concept. Other use cases are also possible.

Figure 8:
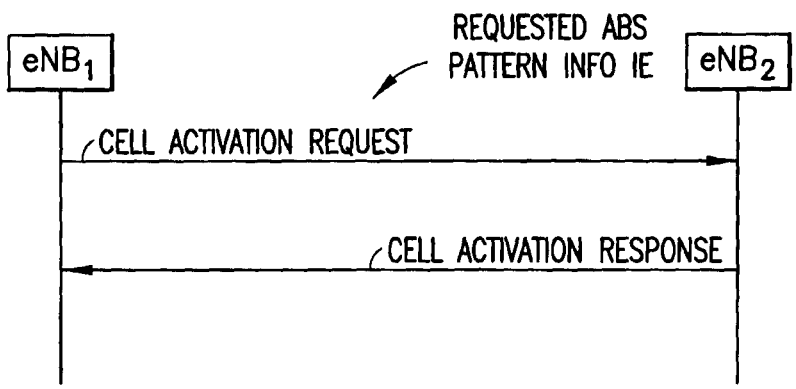
FIG. 8 illustrates Figure 8.3.11.2-1, "Cell Activation, successful operation" of 3GPP TS 36.423 V11.1.0 (June 2012) and also an IE for an exemplary embodiment of the instant invention.

Referring to FIG. 7, this figure illustrates Figure 8.3.1.2-1, "Load Indication, successful operation" of 3GPP TS 36.423 V11.1.0 (June 2012) and also an IE for an exemplary embodiment of the instant invention. In this example, the Requested ABS Pattern Info IE is an exemplary embodiment of the instant invention and may be contained within the LOAD INFORMATION message. According to 8.3.1.1, "[t]he purpose of the Load Indication procedure is to transfer load and interference co-ordination information between eNBs controlling intra-frequency neighboring cells." The eNB$_1$ shown in the figure may be the coverage eNB 107 and the eNB$_2$ shown in the figure may be the CSG HeNB eNB 108. If the Requested ABS Pattern Info IE is contained in the LOAD INFORMATION message, eNB$_2$ (e.g., the CSG HeNB 108) shall, if supported, use the received information for subsequent selection of its ABS Pattern Info IE. For the reactivated pico cell by a coverage cell, the Cell Activation Request message can be used as described below to indicate a requested ABS pattern upon cell activation. The new IE in the LOAD Info message here is intended for other use cases like indicating a requested ABS pattern to a CSG HeNB. Another case is when the pico eNB autonomously activates a dormant cell of its own based on high load on another of its cells on another carrier FIG. 7 is an illustration of a table showing possible content of a LOAD INFORMATION message as shown in section 9.1.2.1 of 3GPP TS 36.423 and information for a new exemplary IE in accordance with an exemplary embodiment of the instant invention. This example provides a Requested ABS Pattern Info IE having a presence of "O" (optional) and having an IE type and reference of "9.2.5.x", where the criticality is "Yes" and the assigned criticality is "ignore".

Regarding cell activation, FIG. 8 illustrates Figure 8.3.11.2-1, "Cell Activation, successful operation" of 3GPP TS 36.423 V11.1.0 (June 2012) and also an TE for an exemplary embodiment of the instant invention. In this example, the Requested ABS Pattern Info IE is an exemplary embodiment of the instant invention and may be contained within the CELL ACTIVATION REQUEST message. According to 8.3.11.1, "[t]he purpose of the Cell Activation procedure is to request to a neighbouring eNB to switch on one or more cells, previously reported as inactive due to energy saving reasons." The eNB$_1$ shown in the figure may be the coverage eNB 107 and the eNB$_2$ shown in the figure may be the capacity booster eNB 108. If the Requested ABS Pattern Info IE is contained in the CELL ACTIVATION REQUEST message, eNB$_2$ (e.g., the capacity booster eNB

108) shall, if supported, use the received information for subsequent selection of its ABS Pattern Info IE.

FIG. 9 is an illustration of a table showing possible content of a CELL ACTIVATION REQUEST message as shown in section 9.1.2.20 of 3GPP TS 36.423 and information for a new exemplary IE in accordance with an exemplary embodiment of the instant invention. The exemplary the Requested ABS Pattern Info IE has a presence of "O" (optional), and has an IE type and reference of "9.2.5.x", where the criticality is "Yes" and the assigned criticality is "ignore".

Turning to FIG. 10, a table is shown illustrating possible information in the Requested ABS Pattern Info IE, in accordance with an exemplary embodiment of the instant invention. Text associated with the table in FIG. 10 might state the following:

"9.2.5x Requested ABS Pattern Info

This IE provides information about which sub frames the sending eNB would like the receiving node to configure as almost blank subframes."

As indicated in the table, for FDD, Select ABS Pattern from has a presence of "M" (mandatory) and an IE type and reference of a BIT STRING (SIZE(40)), and a semantics description of "A bitmap value of '1' indicates subframe(s) as defined in 9.2.54 from which $eNB_2$ is requested to select its ABS Pattern Info IE values(s) of '1'". For TDD, Select ABS Pattern from has a presence of "M" (mandatory) and an IE type and reference of a BIT STRING (1 . . . 70, . . . ), and a semantics description of "A bitmap value of '1' indicates subframe(s) as defined in 9.2.54 from which $eNB_2$ is requested to select its ABS Pattern Info IE values(s) of '1'".

During activation, the pico cell 105 is not expected to be at full capacity, thus the use of scheduling gaps 510/520 will not adversely impact latency and capacity of the pico cell 105. As the pico cell 105 becomes more loaded, the scheduling gaps can be adjusted in time as described above.

Indications of scheduling gaps via, e.g., ABS patterns also can be used by the receiver, e.g., a macro node, as a means to recognize the sending node (e.g., a pico node) has been reactivated and that the reactivation may be the reason if any RLFs/HOFs occur at this time. This may be useful information for example a SON MRO function as described before.

This invention can be used by both centralized (generated by O&M/EMS) or distributed (generated by eNB) procedures that reactivate a cell or by an autonomous activation of the node itself.

Figure 11:
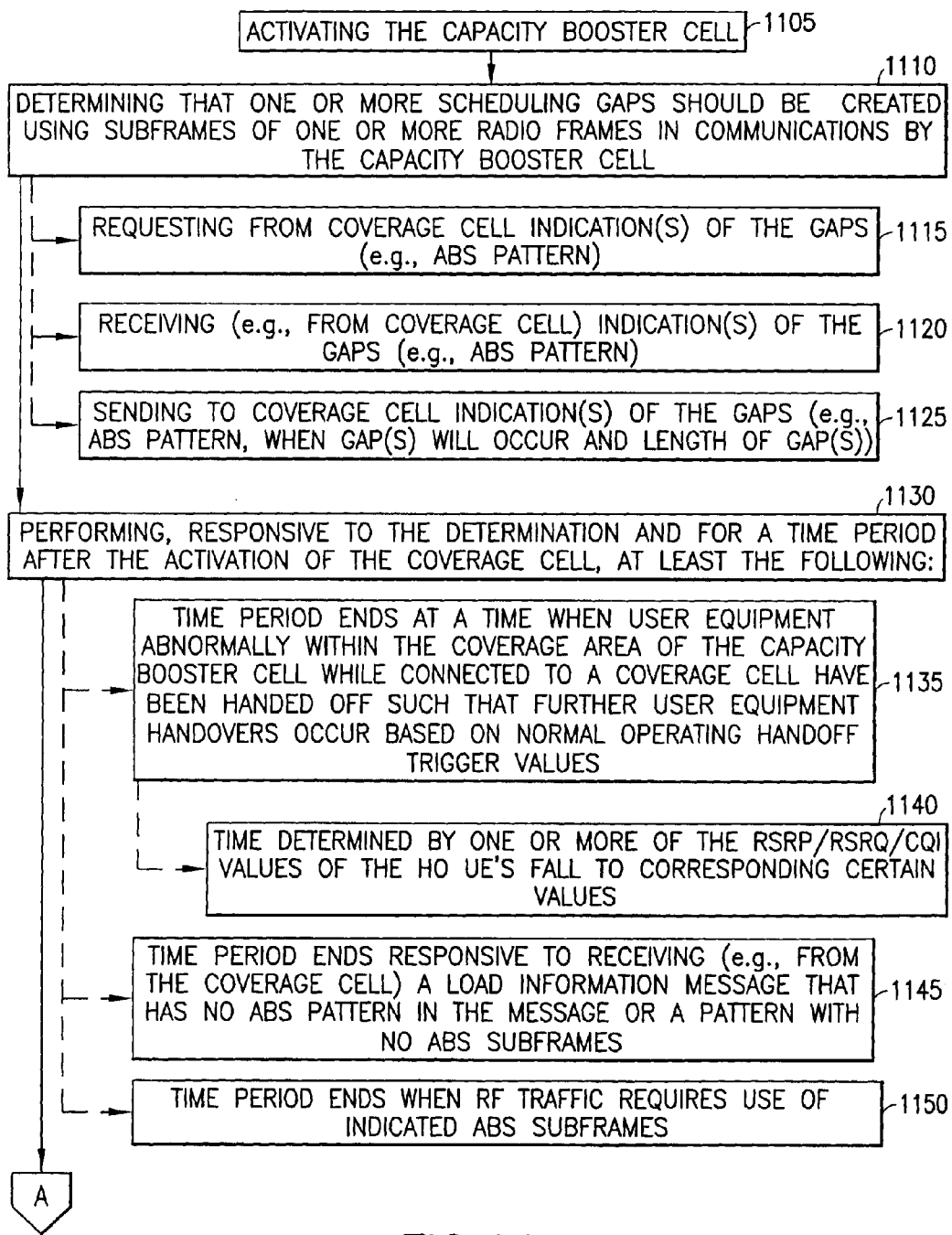
FIGS. 11 to 13 are logic flow diagrams that illustrate the operation of a method, and a result of execution of computer program instructions embodied on a computer readable medium, in accordance with the exemplary embodiments of this invention.
Figure 11:
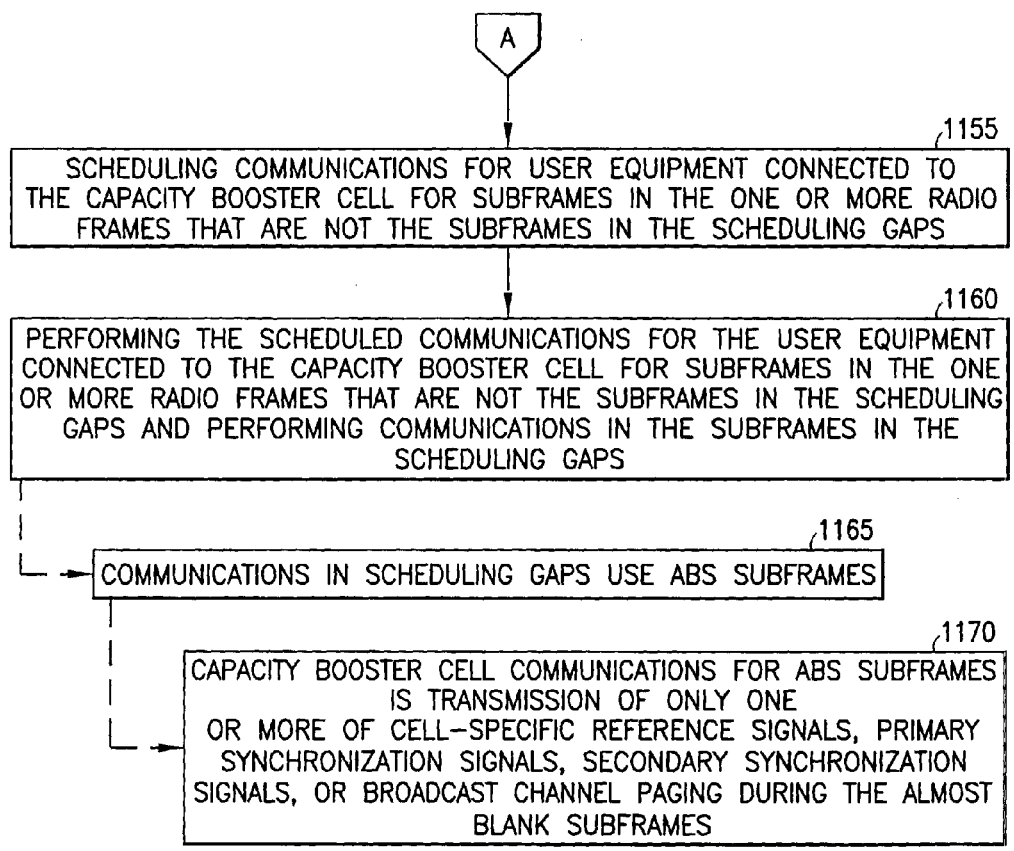

Referring now to FIG. 11, a logic flow diagram is shown that illustrates the operation of a method, and a result of execution of computer program instructions embodied on a computer readable medium, in accordance with the exemplary embodiments of this invention. The method may be performed, e.g., by an eNB 108, e.g., through operation of the computer program code 137 as executed by the one or more processors 172. FIG. 11 is directed to the capacity booster cell 105 and some embodiments of concepts two, three, and four related to the scheduling gaps.

FIG. 11 begins in block 1105, where the capacity booster cell 105 (i.e., eNB 108, e.g., or a CSG HeNB) performs activating the capacity booster cell. In block 1110, the capacity booster cell 105 performs determining that one or more scheduling gaps should be created using subframes of one or more radio frames in communications by the capacity booster cell. Examples of block 1110 are shown in blocks 1115, 1120, and 1125. In one example, in block 1115, the capacity booster cell 105 performs requesting from the coverage cell indication(s) of the gaps (e.g., where the indications include an ABS pattern as shown in FIG. 10). In block 1120, the capacity booster cell 105 performs receiving (e.g., from coverage cell) indication(s) of the gaps (e.g., ABS pattern). The receiving could be responsive to block 1115. In another example, block 1115 is not performed, but the coverage cell 106 sends a message with the indications of the gaps, e.g., as described above in reference to FIGS. 7-10. In block 1125, the capacity booster cell 105 may perform the operation of sending to coverage cell indication(s) of the gaps (e.g., ABS pattern, when gap(s) will occur and length of gap(s)).

Block 1115 is an example where the capacity booster cell 105 can request the coverage cell 106 to send to the capacity booster cell 105 the ABS pattern the capacity booster cell 105 should use. The use case is if it wasn't the coverage cell 106 that sent the cell activation message (which can contain the ABS pattern request) but rather another node on another frequency or the capacity booster cell 105 reactivated itself (e.g., due to high load on an another already activated frequency) on one of its cell frequencies that the coverage cell 106 is already activated on. Another possibility is rather than the coverage cell 106 sending separately to each capacity booster cell 105 the ABS the capacity booster cell 105 should use, the coverage cell 106 instead periodically sends all the capacity booster cells 105 in, e.g., the LOAD INFORMATION message the combined ABS patterns all the capacity booster cells 105 are using. Then the capacity booster cells 105 individually choose an ABS themselves when activated. In an exemplary embodiment, the coverage cell 106 still should indicate separately to a capacity booster cell 105 that the coverage cell 106 does not need ABS protection anymore from the capacity booster cell 105.

In block 1130, the capacity booster cell 105 performs the operation of performing, responsive to the determination and for a time period after the activation of the coverage cell, at least blocks 1155 and 1160. In block 1155, the capacity booster cell 105 performs scheduling communications for user equipment connected to the capacity booster cell for sub frames in the one or more radio frames that are not the sub frames in the scheduling gaps. In block 1160, the capacity booster cell 105 performs the operation of performing the scheduled communications for the user equipment connected to the capacity booster cell for sub frames in the one or more radio frames that are not the subframes in the scheduling gaps and performing communications in the subframes in the scheduling gaps.

The time period can end (block 1135) at a time when user equipment abnormally within the coverage area of the capacity booster cell while connected to a coverage cell have been handed off such that further user equipment handovers occur based on normal operating handoff trigger values. The user equipment that are abnormally within the coverage area of the capacity booster cell are those user equipment that were originally entered and are within the small cell's coverage area while the small cell (re)activated, and the user equipment would have been handed off to the small cell had the small cell been active prior to the user equipment's entry into the coverage area of the small cell. As illustrated by block 1140, the time may be determined by one or more of the RSRP/RSRQ/CQI values of the handed off (from the coverage cell 106 to the capacity booster cell 105) user equipment falling to corresponding certain values.

The time period may also end (block 1145) responsive to receiving (e.g., from the coverage cell) a Load Information message that has no ABS pattern (e.g., shown in FIG. 10) in the message or a pattern with no ABS subframes (e.g., if the ABS patterns shown in FIG. 10 are all zeros with no ones).

As illustrated by block 1150, another example is the time period ends when RF traffic requires use of indicated ABS subframes. That is, if in block 1120, the coverage cell 106 sent indications of the ABS subframes to the capacity booster cell 105, but the capacity booster cell 105 has to begin using the ABS subframes because RF traffic requires the use of these subframes. Note the capacity booster cell 105 does not have to stop sending ABS subframes if the capacity booster cell 105 does not need to use the subframes, i.e., is not experiencing such a load that requires the use of the ABS subframes. So the coverage cell 106 could indicate the coverage cell 106 does not need ABS protection anymore from the capacity booster cell 105, but the capacity booster cell 105 can continue transmitting the ABS subframes until the capacity booster cell 105 needs to use the ABS subframes for its own traffic.

Block 1165 points out that the communications in scheduling gaps may use ABS subframes. Block 1170 is another example, which indicates the capacity booster cell communications for ABS subframes is transmission of only one or more of cell-specific reference signals, primary synchronization signals, secondary synchronization signals, or broadcast channel paging during the almost blank subframes.

Figure 12:
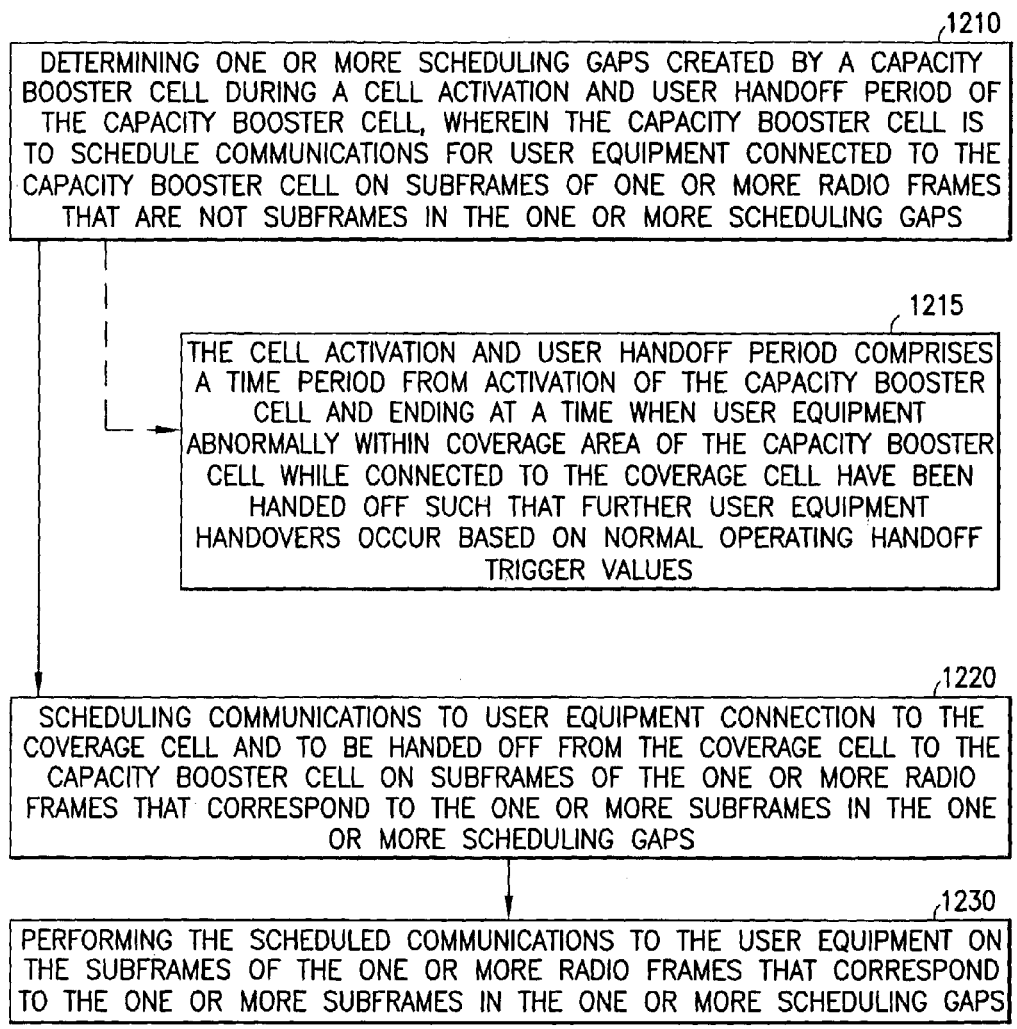

Referring now to FIG. 12, a logic flow diagram is shown that illustrates the operation of a method, and a result of execution of computer program instructions embodied on a computer readable medium, in accordance with the exemplary embodiments of this invention. The method may be performed, e.g., by an eNB 107, e.g., through operation of the computer program code 153 as executed by the one or more processors 150. FIG. 12 is directed to the coverage cell 106 and some embodiments of concepts two, three, and four related to the scheduling gaps.

The flowchart in FIG. 12 begins in block 1210, where the coverage cell eNB 107 performs determining one or more scheduling gaps 510/520 created by a capacity booster cell 105 during a cell activation and user handoff period of the capacity booster cell. The capacity booster cell 105 is to schedule communications for user equipment 110 connected to the capacity booster cell 105 on subframes 540 of one or more radio frames 530 that are not subframes 540 in the one or more scheduling gaps 510/520. One example of a cell activation and user handoff period is shown in block 1215, where the cell activation and user equipment handoff period comprises a time period from activation of the capacity booster cell and ending at a time when user equipment abnormally within coverage area of the capacity booster cell while connected to the coverage cell have been banded off such that further user equipment handovers occur based on normal operating handoff trigger values (see block 1135 of FIG. 11). Note that block 1140 (and perhaps blocks 1145 and 1150) may also be used to determine the cell activation and user equipment handoff period. In block 1220, the coverage cell eNB 107 performs scheduling communications to user equipment 110 connected to the coverage cell 106 and to be handed off from the coverage cell 106 to the capacity booster cell 105 on subframes 540 of the one or more radio frames 530 that correspond to the one or more subframes 540 in the one or more scheduling gaps 510/520. In block 1230, the coverage cell eNB 107 performs the operation of performing the scheduled communications to the user equipment 110 on the subframes 540 of the one or more radio frames 530 that correspond to the one or more subframes 540 in the one or more scheduling gaps 510/520.

Figure 13:
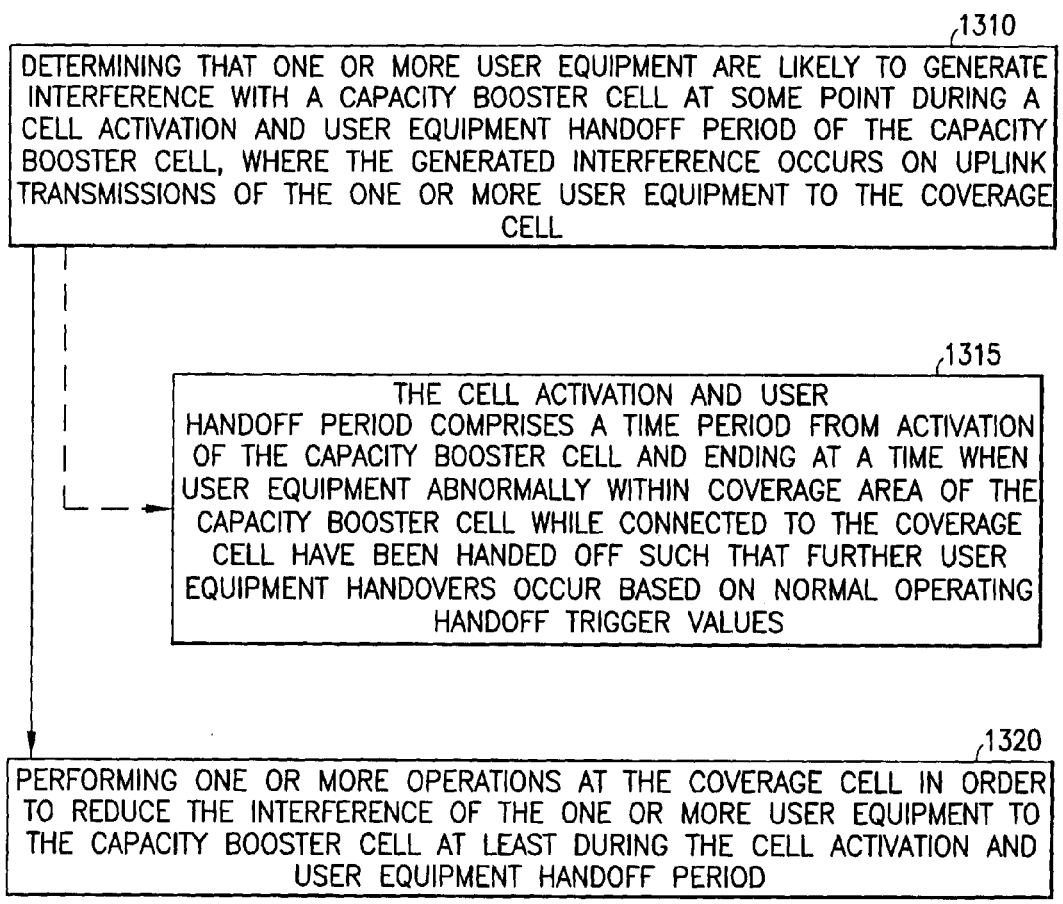

Turning to FIG. 13, a logic flow diagram is shown that illustrates the operation of a method, and a result of execution of computer program instructions embodied on a computer readable medium, in accordance with the exemplary embodiments of this invention. The method may be performed, e.g., by an eNB 107, e.g., through operation of the computer program code 153 as executed by the one or more processors 150. FIG. 13 is directed to the coverage cell 106 and embodiments of concept three above unrelated to the scheduling gaps.

The flowchart in FIG. 13 begins in block 1310, where the coverage cell eNB 107 performs determining that one or more user equipment 110 are likely to generate interference with a capacity booster cell 105 at some point during a cell activation and user equipment handoff period of the capacity booster cell 105, where the generated interference occurs on uplink transmissions of the one or more user equipment 110 to the coverage cell 106. One example of a cell activation and user handoff period is shown in block 1315, where the cell activation and user equipment handoff period comprises a time period from activation of the capacity booster cell and ending at a time when user equipment abnormally within coverage area of the capacity booster cell while connected to the coverage cell have been handed off such that further user equipment handovers occur based on normal operating handoff trigger values (see block 1135 of FIG. 11). Note that block 1140 (and perhaps blocks 1145 and 1150) may also be used to determine the cell activation and user equipment handoff period. In block 1320, the coverage cell eNB 107 performs the operation of performing one or more operations at the coverage cell 106 in order to reduce the interference of the one or more user equipment 110 to the capacity booster cell 105 at least during the cell activation and user equipment handoff period.

Embodiments of the present invention may be implemented in software (executed by one or more processors), hardware (e.g., an application specific integrated circuit), or a combination of software and hardware. In an example embodiment, the software (e.g., application logic, an instruction set) is maintained on any one of various conventional computer-readable media. In the context of this document, a "computer-readable medium" may be any media or means that can contain, store, communicate, propagate or transport the instructions for use by or in connection with an instruction execution system, apparatus, or device, such as a computer, with one example of a computer described and depicted, e.g., in FIG. 2. A computer-readable medium may comprise a computer-readable storage medium (e.g., memory 136, 155, 195 or other device) that may be any media or means that can contain or store the instructions for use by or in connection with an instruction execution system, apparatus, or device, such as a computer.

If desired, the different functions discussed herein may be performed in a different order and/or concurrently with each other. Furthermore, if desired, one or more of the above-described functions may be optional or may be combined.

Although various aspects of the invention are set out in the independent claims, other aspects of the invention comprise other combinations of features from the described embodiments and/or the dependent claims with the features of the independent claims, and not solely the combinations explicitly set out in the claims.

It is also noted herein that while the above describes example embodiments of the invention, these descriptions should not be viewed in a limiting sense. Rather, there are several variations and modifications which may be made without departing from the scope of the present invention as defined in the appended claims.

The following abbreviations that may be found in the specification and/or the drawing figures are defined as follows:
3GPP Third Generation Partnership Project
ABS Almost Blank Subframe
BCH Broadcast CHannel
CRE Cell Range Extended
CRS Cell-specific Reference Signal
CQI Channel Quality Indicator
dB decibels
DL DownLink (from base station to user equipment)
DMRS DeModulation Reference Signal
EMS Element Management System
eNB or eNode B evolved Node B (LTE base station)
eICIC enhanced Inter-Cell Interference Coordination
EPC Evolved (or enhanced) Packet Core
ES Energy Savings
E-UTRA Evolved Universal Terrestrial Radio Access
E-UTRAN Evolved Universal Terrestrial Radio Access Network
FDD Frequency Division Duplex
HetNet Heterogeneous Network
HO Hand Over or Hand Off
HOF HO Failure
ID identification
IE Information Element
INS IN Service
L1 a physical layer (e.g., PHY)
L2 a data link layer (e.g., RLC/MAC)
L3 a network layer (e.g., RRC/RRM)
LTE Long Term Evolution
MAC Media Access Control
MCS Modulation and Coding Scheme
MRO Mobility Robustness Optimization
MUE Macro UE
OOS Out Of Service
PBCH Physical Broadcast CHannel
PDCCH Physical Downlink Control CHannel
PDSCH Physical Downlink Shared CHannel
PRB Physical Resource Block
PSS Primary Synchronization Signal
PUE Pico UE
RAN Radio Access Network
Rel Release
Rx or RX receiving or receiver
RLC Radio Link Control
RLF Radio Link Failure
RRC Radio Resource Control
RRM Radio Resource Management
RSRP Reference Signal Received Power
RSRQ Reference Signal Received Quality
SIB System Information Block
SINR Signal to Interference Noise Ratio
SOW Serving GateWay
SON Self Optimizing Network
SSS Secondary Synchronization Signal
TDD Time Division Duplex
Tx or TX transmitting or transmitter
TS Technical Standard
UE User Equipment
Uu LTE air interface

What is claimed is:

1. A method, comprising:
in response to cell activation of a capacity booster cell, determining users in a coverage area of the capacity booster cell;
determining an order of handing off user equipment from a coverage cell to the capacity booster cell based on one or more channel performance metrics;
handing off at least one user equipment according to the order from the coverage cell to the capacity booster cell; and
exchanging information comprising at least one of:
number of pending and current handovers from the coverage cell to the capacity booster cell, and
reference signal received power measurements from user equipment to be handed over.

2. The method of claim 1, wherein determining an order further comprises sorting user equipment by a channel performance metric of measurements of one or more reference signals for the capacity booster cell as determined by the user equipment and wherein handing off further comprises handing off at least one user equipment with a good connection as determined by the measurements of the one or more reference signals prior to handing off user equipment with not as good a connection as determined by the measurements of the one or more reference signals.

3. The method of claim 1, wherein determining an order further comprises sorting user equipment by a channel performance metric of measurements of the coverage cell as determined by the user equipment and handing off further comprises handing off at least one user equipment having a worse connection as determined by the measurements of the coverage cell prior to handing off user equipment with not as good a connection as determined by the measurements of the coverage cell.

4. The method of claim 2, wherein the channel performance metric comprises one of reference signal received power or reference signal received quality.

5. The method of claim 1, wherein determining an order further comprises sorting user equipment by distances of the user equipment from the capacity booster cell and handing off further comprises handing off at least one user equipment closer to the capacity booster cell prior to handing off user equipment further away from the capacity booster cell.

6. The method of claim 1, wherein determining an order further comprises sorting user equipment by channel quality indication reports of the user equipment for the coverage cell and handing off further comprises handing off at least one user equipment having worse channel quality indication reports prior to handing off user equipment having better channel quality indication reports.

7. The method of claim 1, wherein determining an order further comprises sorting user equipment by maximum data rates configured for user equipment bearers associated with the user equipment for the coverage cell and handing off further comprises handing off at least one user equipment having higher data rates prior to handing off user equipment having lower data rates.

8. An apparatus, comprising:
one or more processors; and
one or more memories including computer program code,
the one or more memories and the computer program code configured, with the one or more processors, to cause the apparatus to perform at least the following:
determine, in response to cell activation of a capacity booster cell, users in a coverage area of the capacity booster cell;
determine an order of handing off user equipment from a coverage cell to the capacity booster cell based on one or more channel performance metrics;

hand off at least one user equipment according to the order from the coverage cell to the capacity booster cell; and exchange information comprising at least one of:
number of pending and current handovers from the coverage cell to the capacity booster cell;
reference signal received power measurements from user equipment to be handed over.

9. A computer program product comprising a non-transitory computer-readable storage medium bearing computer program code embodied therein for use with an apparatus, the computer program code comprising code for performing the following method:
in response to cell activation of a capacity booster cell, determining users in a coverage area of the capacity booster cell;
determining an order of handing off user equipment from a coverage cell to the capacity booster cell based on one or more channel performance metrics;
handing off at least one user equipment according to the order from the coverage cell to the capacity booster cell; and
exchanging information comprising at least one of:
number of pending and current handovers from the coverage cell to the capacity booster cell, and
reference signal received power measurements from user equipment to be handed over.

10. The apparatus of claim 8, wherein determining the order further comprises sorting user equipment by a channel performance metric of measurements of one or more reference signals for the capacity booster cell as determined by the user equipment and wherein the handing off further comprises handing off at least one user equipment with a good connection as determined by the measurements of the one or more reference signals prior to handing off user equipment with not as good a connection as determined by the measurements of the one or more reference signals.

11. The apparatus of claim 8, wherein determining an order further comprises sorting user equipment by a channel performance metric of measurements of the coverage cell as determined by the user equipment and handing off further comprises handing off at least one user equipment having a worse connection as determined by the measurements of the coverage cell prior to handing off user equipment with not as good a connection as determined by the measurements of the coverage cell.

12. The apparatus of claim 10, wherein the channel performance metric comprises one of reference signal received power or reference signal received quality.

13. The apparatus of claim 8, wherein determining an order further comprises sorting user equipment by distances of the user equipment from the capacity booster cell and handing off further comprises handing off at least one user equipment closer to the capacity booster cell prior to handing off user equipment further away from the capacity booster cell.

14. The apparatus of claim 8, wherein determining an order further comprises sorting user equipment by channel quality indication reports of the user equipment for the coverage cell and handing off further comprises handing off at least one user equipment having worse channel quality indication reports prior to handing off user equipment having better channel quality indication reports.

15. The apparatus of claim 8, wherein determining an order further comprises sorting user equipment by maximum data rates configured for user equipment bearers associated with the user equipment for the coverage cell and handing off further comprises handing off at least one user equipment having higher data rates prior to handing off user equipment having lower data rates.

16. The computer program product of claim 9, wherein determining an order further comprises sorting user equipment by a channel performance metric of measurements of one or more reference signals for the capacity booster cell as determined by the user equipment and wherein handing off further comprises handing off at least one user equipment with a good connection as determined by the measurements of the one or more reference signals prior to handing off user equipment with not as good a connection as determined by the measurements of the one or more reference signals.

17. The computer program product of claim 9, wherein determining an order further comprises sorting user equipment by a channel performance metric of measurements of the coverage cell as determined by the user equipment and handing off further comprises handing off at least one user equipment having a worse connection as determined by the measurements of the coverage cell prior to handing off user equipment with not as good a connection as determined by the measurements of the coverage cell.

18. The computer program product of claim 16, wherein the channel performance metric comprises one of reference signal received power or reference signal received quality.

19. The computer program product of claim 9, wherein determining an order further comprises sorting user equipment by distances of the user equipment from the capacity booster cell and handing off further comprises handing off at least one user equipment closer to the capacity booster cell prior to handing off user equipment further away from the capacity booster cell.

20. The computer program product of claim 9, wherein determining an order further comprises sorting user equipment by channel quality indication reports of the user equipment for the coverage cell and handing off further comprises handing off at least one user equipment having worse channel quality indication reports prior to handing off user equipment having better channel quality indication reports.

* * * * *